(12) United States Patent
Kamiya

(10) Patent No.: US 9,249,771 B2
(45) Date of Patent: Feb. 2, 2016

(54) ENGINE CONTROLLING APPARATUS

(75) Inventor: Yusuke Kamiya, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 1213 days.

(21) Appl. No.: 12/730,720

(22) Filed: Mar. 24, 2010

(65) Prior Publication Data

US 2011/0046864 A1 Feb. 24, 2011

Related U.S. Application Data

(63) Continuation-in-part of application No. PCT/JP2009/064654, filed on Aug. 21, 2009.

(51) Int. Cl.
*G06F 19/00* (2011.01)
*F02N 11/08* (2006.01)
(Continued)

(52) U.S. Cl.
CPC ........... *F02N 11/0833* (2013.01); *B60T 8/1755* (2013.01); *B60W 30/02* (2013.01);
(Continued)

(58) Field of Classification Search
CPC .... Y02T 10/642; B60W 10/08; B60W 20/00; B62D 5/046; B62D 5/065; B62D 6/00; B62D 6/003; B62D 6/005; B62D 7/159; B60G 2300/50; B60G 2300/60; B60H 1/3205; B60H 1/322; B60K 17/046; B60K 2007/0038; B60K 2007/0092; F02N 2200/08; F02N 2200/08041; F02N 2200/10; F02N 2200/101; F02N 2200/102; F02N 2200/022; F02N 2200/0808; F02N 2200/0809; F02N 2200/105; F02N 2200/124; F02N 2300/2011
USPC ............. 701/102, 22, 67, 112, 113; 180/65.1, 180/65.2, 65.25, 65.26, 65.28, 65.285; 477/3, 4, 5, 166, 178; 903/902, 903, 903/905, 906; 123/179.3, 179.4
See application file for complete search history.

(56) References Cited

U.S. PATENT DOCUMENTS 5,372,214 A * 12/1994 Haga et al. ..................... 180/422
6,013,992 A * 1/2000 Ishikawa et al. .............. 318/376
(Continued)

FOREIGN PATENT DOCUMENTS

JP    60-166727    8/1985
JP    2000-265870    9/2000
(Continued)

OTHER PUBLICATIONS

International Search Report issued on Sep. 15, 2009 in PCT/JP2009/064654.
(Continued)

*Primary Examiner* — Hai Huynh
*Assistant Examiner* — Gonzalo Laguarda
(74) *Attorney, Agent, or Firm* — Oblon, McClelland, Maier & Neustadt, L.L.P.

(57) ABSTRACT

An engine controlling apparatus for executing (i) an engine automatic stop control and/or (ii) an engine automatic restart control, during running of a vehicle. The controlling apparatus includes: an allowing/inhibiting device configured to selectively allow and inhibit execution of (i) the engine automatic stop control and/or (ii) the engine automatic restart control, by comparing each of at least one of (a) a plurality of physical amounts including (a-1) behavior-representing physical amounts and (a-2) turning-behavior-influencing physical amounts, with (b) a threshold value which is determined, depending on a running velocity of the vehicle, for the each of the at least one of the physical amounts. The behavior-representing physical amounts include at least one turning-behavior-representing physical amount. The allowing/inhibiting device includes a turning-behavior-basis allowing/inhibiting portion that is configured to selectively allow and inhibit the execution of (i) the engine automatic stop control and/or (ii) the engine automatic restart control, by comparing each of the at least one turning-behavior-representing physical amount, with the threshold value.

17 Claims, 15 Drawing Sheets

(51) Int. Cl.
*B60T 8/1755* (2006.01)
*B60W 30/02* (2012.01)
*B60W 30/18* (2012.01)
*B62D 5/065* (2006.01)
*F02D 41/12* (2006.01)

(52) U.S. Cl.
CPC ... *B60W30/18072* (2013.01); *B60W 30/18145* (2013.01); *F02N 11/0822* (2013.01); *F02N 11/0837* (2013.01); *B62D 5/065* (2013.01); *F02D 41/12* (2013.01); *F02N 2200/0801* (2013.01); *F02N 2200/0808* (2013.01); *F02N 2200/102* (2013.01); *F02N 2200/124* (2013.01); *Y02T 10/48* (2013.01)

(56) References Cited

U.S. PATENT DOCUMENTS

| | | | |
|---|---|---|---|
| 6,392,418 B1* | 5/2002 | Mir et al. | 324/503 |
| 6,504,259 B1 | 1/2003 | Kuroda et al. | |
| 6,725,963 B2* | 4/2004 | Dixon et al. | 180/419 |
| 7,248,958 B2* | 7/2007 | Watanabe et al. | 701/70 |
| 7,845,459 B2* | 12/2010 | Kasai | 180/443 |
| 8,100,221 B2* | 1/2012 | Stuhldreher et al. | 180/441 |
| 8,406,954 B2* | 3/2013 | Whitney et al. | 701/36 |
| 8,498,802 B2* | 7/2013 | Yamamoto | F02D 29/02 701/112 |
| 2001/0025219 A1* | 9/2001 | Ohba et al. | 701/89 |
| 2003/0022755 A1 | 1/2003 | Mizutani | |
| 2005/0051125 A1* | 3/2005 | Braun | B60K 6/48 123/179.3 |
| 2007/0272187 A1 | 11/2007 | Celisse et al. | |
| 2008/0066991 A1* | 3/2008 | Kataoka et al. | 180/443 |
| 2009/0093931 A1* | 4/2009 | Mizutani et al. | 701/42 |
| 2009/0176611 A1* | 7/2009 | Avery | 475/5 |
| 2010/0025131 A1* | 2/2010 | Gloceri et al. | 180/65.28 |
| 2010/0082191 A1* | 4/2010 | Seo et al. | 701/22 |
| 2011/0014828 A1* | 1/2011 | Domes | 440/3 |
| 2011/0130922 A1* | 6/2011 | Shen et al. | 701/41 |
| 2012/0000725 A1* | 1/2012 | Stuhldreher et al. | 180/421 |
| 2012/0270701 A1* | 10/2012 | Christen | B60W 10/06 477/171 |
| 2014/0107887 A1* | 4/2014 | Bissontz | 701/34.4 |
| 2014/0116793 A1* | 5/2014 | Pelletier et al. | 180/65.225 |

FOREIGN PATENT DOCUMENTS

| | | |
|---|---|---|
| JP | 2001-55941 | 2/2001 |
| JP | 2005-139941 | 6/2005 |
| JP | 2005-351202 | 12/2005 |
| JP | 2005351202 A * | 12/2005 |
| JP | 2006-200370 | 8/2006 |
| JP | 2007-56789 | 3/2007 |
| JP | 2007056789 A * | 3/2007 |
| JP | 2008-179296 | 8/2008 |

OTHER PUBLICATIONS

International Preliminary Report on Patentability and Written Opinion issued on Mar. 13, 2012 in PCT/JP2009/064654 filed on Aug. 21, 2009.

Japanese Office Action issued May 1, 2012, in Japan patent application No. 2010-513519 (with English Translation).

Japanese Office Action issued Feb. 7, 2012 in patent application No. 2010-513519 with English translation.

* cited by examiner (a)

(b)

ENGINE CONTROLLING APPARATUS

CROSS-REFERENCE TO RELATED APPLICATIONS

This is a continuation-in-part of PCT application No. PCT/JP2009/064654 filed on Aug. 21, 2009 and designating the United States.

BACKGROUND OF THE INVENTION

1. Field of the Invention

The present invention relates to automatic stop and restart of an engine.

2. Discussion of Related Art

JP-2005-351202A discloses an engine controlling apparatus for automatically stopping and restarting an engine of a vehicle during stopping of the vehicle. This engine controlling apparatus is configured, when a steering angle of a steering wheel of the vehicle becomes equal to or larger than a predetermined angle during stopping of the vehicle, to inhibit automatic stop of the engine that is in its activated state or to cause automatic restart of the engine that is in its stopped state.

When the steering angle of the steering wheel is not smaller than the predetermined angle, an electric power consumed by a drive motor of a power steering apparatus is considerably large, so that there would be a problem such as reduction of a battery voltage if the engine were in its stopped state. For avoiding such a problem, the engine controlling apparatus is configured to cause automatic restart of the engine when the engine is in its stopped state, and to inhibit automatic stop of the engine when the engine is in its activated state.

JP-2006-200370A discloses an engine controlling apparatus for automatically stopping and restarting an engine of a vehicle during running of the vehicle. This engine controlling apparatus is configured, when a steering velocity of a steering wheel of the vehicle becomes equal to or larger than a predetermined velocity during running of the vehicle, to cause automatic restart of the engine. Since after the steering wheel is abruptly turned there is a high possibility that a braking operation would be performed, it is necessary to obtain a booster negative pressure after abrupt turn of the steering wheel. To this end, the engine is automatically restarted.

In this engine controlling apparatus, the predetermined velocity of the steering velocity is a predetermined fixed value that is constant irrespective of whether a running velocity of the vehicle is high or low.

SUMMARY OF THE INVENTION

The present invention has an object to improve an engine controlling apparatus.

The engine controlling apparatus according to a principle of the invention is an engine controlling apparatus is configured, during running of a vehicle, to execute at least one of (i) an engine automatic stop control for automatically stopping an engine of the vehicle and (ii) an engine automatic restart control for automatically restarting the engine, the engine controlling apparatus including: an allowing/inhibiting device configured to selectively allow and inhibit execution of the least one of (i) the engine automatic stop control and (ii) the engine automatic restart control, by comparing each of at least one of (a) a plurality of physical amounts including (a-1) behavior-representing physical amounts each representing behavior of the vehicle and (a-2) turning-behavior-influencing physical amounts each influencing the behavior of the vehicle upon turning of the vehicle, with (b) a threshold value which is determined, depending on a running velocity of the vehicle, for the each of the at least one of the physical amounts.

The engine controlling apparatus according to the principle of the invention is configured, during running of a vehicle, to execute at least one of the engine automatic stop control and the engine automatic restart control (hereinafter simply referred to as "automatically stop and/or restart the engine" where appropriate).

(I) When the engine is automatically stopped or restarted during turning of the vehicle, there is a case in which the turning behavior of the vehicle becomes unstable. For example, during turning of the vehicle, a resultant force which is composed of a longitudinal force component and a lateral force component and which is applied from a road surface to a tire of the vehicle, and magnitude of the longitudinal force component is changed when the engine is automatically stopped or restarted. As a result of the change of the magnitude of the longitudinal force component, the resultant force acting on the tire is changed in magnitude and direction whereby the turning behavior of the vehicle could become unstable. Further, when the engine is automatically stopped during turning of the vehicle, a spinning tendency could be increased, namely, a tuck-in phenomenon could be caused due to, for example, a load movement.

The turning behavior of the vehicle is more likely to become unstable due to the automatic stop or restart of the engine upon turning of the vehicle when a steering velocity as a turning-behavior-representing physical amount is high, than when the steering velocity is low. Further, even without change of the steering velocity, the turning behavior of the vehicle is more likely to become unstable due to the automatic stop or restart of the engine upon turning of the vehicle when a running velocity of the vehicle is high, than when the running velocity is low.

The engine controlling apparatus according to the principle of the invention is configured to inhibit execution of the engine automatic stop control and/or the engine automatic restart control, when the physical amount such as a physical amount representing the behavior of the vehicle upon turning of the vehicle is larger than the threshold value which is determined, depending on the running velocity of the vehicle. Thus, it is possible to satisfactorily avoid the turning behavior of the vehicle from becoming unstable due to the automatic stop or restart of the engine. Further, when the steering velocity is lower than the steering velocity, in principle, the automatic stop and restart of the engine are allowed whereby a fuel efficiency can be improved.

In an arrangement in which the automatic stop of the engine is inhibited when an absolute value of a steering angle is larger than a fixed threshold value irrespective whether the running velocity of the vehicle is high or low, where the fixed threshold value is set to a value (small value) such that the turning behavior of the vehicle does not become unstable even when the vehicle running velocity is high, there would be many opportunities to inhibit the automatic stop and restart of the engine, thereby making it impossible to effectively improve the fuel efficiency. Further, in this arrangement, where the fixed threshold value is set to a value (relatively large value) such that the turning behavior of the vehicle does not become unstable only when the vehicle running velocity is low, it would be difficult to assure stability of the behavior although the fuel efficiency could be effectively improved.

On the other hand, where the threshold value is set to a value that is smaller when the vehicle running velocity is high than when the running velocity is small, it is possible to inhibit the automatic stop and restart of the engine precisely when the behavior is really unstable, thereby making it possible to improve the fuel efficiency and assure stability of the behavior.

(II) It is not preferable that, during running of the vehicle, the engine is automatically stopped or restarted against an intention of an operator of the vehicle. For example, if the engine placed in its activated state is automatically stopped when the vehicle operator does not have an intention to stop running of the vehicle, the operator could feel something is wrong. Further, if the automatic stop and restart of the engine take place repeatedly, particularly, during running of the vehicle at a low velocity, the operator could be frustrated. It is preferable that the engine placed in its activated state is automatically stopped precisely when the operator has an intention to stop running of the vehicle.

It is possible to assume that the operator's intention to stop running of the vehicle is more strong when deceleration of the vehicle as one of the behavior-representing physical amounts is high than when the deceleration is low. Further, it is possible to assume that, even if there is no difference of the vehicle deceleration, the operator's intention to stop running of the vehicle is more strong when running velocity of the vehicle is low than when the running velocity is high.

In view of this, the engine controlling apparatus according to the principle of the invention may be configured to allow the automatic stop of the engine when the deceleration of the vehicle is higher than the threshold value determined depending on the running velocity of the vehicle, i.e., when it is assumed that the vehicle operator has an intention to stop running of the vehicle, and may be configured to inhibit the automatic stop of the engine when the deceleration of the vehicle is not higher than the threshold value, i.e., when the vehicle operator does not have an intention to stop running of the vehicle. By this arrangement, it is possible to improve the fuel efficiency and also to avoid the automatic stop and restart of the engine against an intension of the vehicle operator. Further, the automatic stop and restart of the engine may be both inhibited when the vehicle operator does not have an intention to stop running of the vehicle. By this arrangement, it is possible to avoid the vehicle operator from being frustrated by repeat of the automatic stop and restart of the engine.

(III) Further, the turning behavior of the vehicle is more likely to become unstable, for example, when a friction coefficient of a road surface as one of the turning behavior-influencing physical amounts is low (low μ), than when the friction coefficient is high (high μ). Further, even without change of the friction coefficient, the turning behavior of the vehicle is more likely to be unstable when the running velocity of the vehicle is high, than when the running velocity is low.

In view of this, the engine controlling apparatus according to the principle of the invention may be configured to inhibit the automatic stop and restart of the engine when the friction coefficient of the road surface is lower than a threshold value that is determined depending on the running velocity of the vehicle. By this arrangement, it is possible to improve the fuel efficiency and to assure stability of the behavior.

The engine controlling apparatus according to the principle of the invention, which is configured to execute at least one of the engine automatic stop control and the engine automatic restart control, may be capable of executing both the engine automatic stop control and the engine automatic restart control. In this arrangement (A), there are (i) a case in which the automatic stop of the engine is selectively allowed and inhibited (without the automatic restart of the engine being selectively allowed and inhibited), (ii) a case in which the automatic restart of the engine is selectively allowed and inhibited (without the automatic stop of the engine being selectively allowed and inhibited) and (iii) a case in which the automatic stop of the engine is selectively allowed and inhibited while the automatic restart of the engine is selectively allowed and inhibited. Further, the engine controlling apparatus according to the principle of the invention may be capable of executing the engine automatic stop control and not capable of executing the engine automatic restart control, so that the automatic stop of the engine is selectively allowed and inhibited in this arrangement (B). Still further, the engine controlling apparatus according to the principle of the invention may be capable of executing the engine automatic restart control and not capable of executing the engine automatic stop control, so that the automatic restart of the engine is selectively allowed and inhibited in this arrangement (C).

CLAIMABLE INVENTION

There will be described, by ways of examples, various modes of the invention deemed to contain claimable features for which protection is sought. Hereinafter, the invention deemed to contain the claimable features will be referred to as "claimable invention" where appropriate. The claimable invention includes at least "the present invention" or "the invention of the present application" which is an invention described in claims, and could include also specific concept of the invention of the present application, generic concept of the invention of the present application and other concept of the invention of the present application. Each of these modes of the invention is numbered like the appended claims and depends from the other mode or modes, where appropriate, for easier understanding of the technical features disclosed in the present specification. It is to be understood that the claimable invention is not limited to the technical features or any combinations thereof which will be described in each of these modes. That is, the scope of the claimable invention should be interpreted in the light of the following descriptions accompanying the various modes, preferred embodiments of the invention and prior art. In a limit in accordance with such an interpretation, a mode of the claimable invention can be constituted by not only each one of these modes but also either a mode provided by any one of these modes and additional components incorporated therein or a mode provided by any one of these modes without some of components recited therein.

(1) An engine controlling apparatus for executing, during running of a vehicle, at least one of (i) an engine automatic stop control for automatically stopping an engine of the vehicle and (ii) an engine automatic restart control for automatically restarting the engine, the engine controlling apparatus including:

an allowing/inhibiting device configured to selectively allow and inhibit execution of the least one of (i) the engine automatic stop control and (ii) the engine automatic restart control, by comparing each of at least one of (a) a plurality of physical amounts including (a-1) behavior-representing physical amounts each representing behavior of the vehicle and (a-2) turning-behavior-influencing physical amounts each influencing the behavior of the vehicle upon turning of the vehicle, with (b) a threshold value which is determined, depending on a running velocity of the vehicle, for the each of the at least one of the physical amounts.

The term "during running of the vehicle" means that the vehicle is not in its stopped state. Thus, it may be regarded that the vehicle is running, (a) when the vehicle running velocity is higher than a value which makes is possible to judge that the vehicle is in its stopped state, (b) when the vehicle running velocity is not lower than a value which is dependent on performance of a sensor for detecting the running velocity and which is minimumly required for the sensor to detect the running of the vehicle, and (c) when the vehicle running velocity is not lower than a value which causes the behavior (or turning behavior) to be problematic, or which induces a high probability that the behavior (or turning behavior) becomes unstable. Further, it may be regarded that the vehicle is running when the running velocity of the vehicle is not lower than a value which is selected from a range of 1.3 km/h, which is selected from a range of 10-20 km/h or which is selected from a range of 30-40 km/h. Further, the above-described value which is sufficiently high for causing the behavior (or turning behavior) to be problematic may be set to a value that is lower when the friction coefficient of the road surface is low (low μ) than when the friction coefficient is high (high μ).

It is noted that the automatic stop and restart of the engine may be inhibited during running of the vehicle on a road surface having a low friction coefficient (that is lower than a predetermined value).

(2) The engine controlling apparatus according to mode (1), wherein the allowing/inhibiting device is configured to selectively allow and inhibit the execution of the at least one of (i) the engine automatic stop control and (ii) the engine automatic restart control, by comparing each of at least one of the behavior-representing physical amounts, with the threshold value which is determined for the each of the at least one of the behavior-representing physical amounts, and wherein the at least one of the behavior-representing physical amounts includes (a-1-1) at least one turning-behavior representing physical amount representing the behavior of the vehicle upon turning of the vehicle and/or (a-1-2) at least one braking-behavior-representing physical amount representing the behavior of the vehicle upon braking of the vehicle.

(3) The engine controlling apparatus according to mode (2), wherein the at least one turning-behavior-representing physical amount includes at least one of an absolute value of velocity of operation of a steering member of the vehicle performed by an operator of the vehicle, an absolute value of amount of the operation of the steering member, an absolute value of yaw rate of the vehicle, an absolute value of slip angle of a body of the vehicle and an absolute value of lateral slip angle of a front wheel of the vehicle, and wherein the at least one braking-behavior-representing physical amount includes at least one of amount representing deceleration of the vehicle and amount representing state of operation of a brake operating member performed by the operator.

The at least one turning-behavior-representing physical amount may include, for example, a physical amount representing actual behavior of the vehicle upon turning of the vehicle and a physical amount representing an intention of the vehicle operator to turn the vehicle. The physical amount representing actual behavior of the vehicle upon turning of the vehicle may be, for example, an absolute value of yaw rate of the vehicle, an absolute value of lateral acceleration of the vehicle, an absolute value of slip angle of a body of the vehicle, an absolute value of lateral slip angle of a wheel of the vehicle and a radius of turning of the vehicle. The physical amount representing an intention of the vehicle operator to turn the vehicle may be, for example, absolute values of respective steering amount, steering velocity and steering acceleration. Where the steering member is a steering wheel, the steering amount corresponds to a steering angle, and the steering velocity and steering acceleration are represented by a steering angle velocity and a steering angle acceleration, respectively. As a physical amount based on the intention of the vehicle operator to turn the vehicle and the actual turning behavior, there is an absolute value of a yaw rate deviation. Further, a value obtained by substituting two or more of these values into a predetermined function also corresponds to the turning-behavior-representing physical amount.

The at least one braking-behavior-representing physical amount may include, for example, a physical amount representing actual state of the vehicle upon braking of the vehicle and a physical amount representing an intention of the vehicle operator to brake the vehicle. The physical amount representing actual state of the vehicle upon braking of the vehicle may be, for example, deceleration of the vehicle and braking force or torque acting on a wheel of the vehicle. The physical amount representing the intention of the vehicle operator to brake the vehicle may be, for example, an operating force applied to a brake operating member of the vehicle, a physical amount representing a brake operation state such as an amount of operation of the brake operating member or a brake application force (e.g., pressing force applied from a friction member to a brake rotary body where a braking system of the vehicle is a friction braking system).

It is noted that the physical amount may be, for example, the steering velocity or the yaw rate so that an absolute value of the physical amount corresponds to an absolute value of the steering velocity or yaw rate.

(4) The engine controlling apparatus according to any one of modes (1)-(3), wherein the allowing/inhibiting device is configured to selectively allow and inhibit the execution of the at least one of (i) the engine automatic stop control and (ii) the engine automatic restart control, by comparing each of at least one of the turning-behavior-influencing physical amounts, with the threshold value which is determined for the each of the at least one of the turning-behavior-influencing physical amounts, and wherein the at least one of the turning-behavior-influencing physical amounts includes a friction coefficient of a road surface.

The friction coefficient of the road surface may be obtained, for example, from weather information acquired via a communication or information representing state of the road surface (which is acquired via a communication or which is included in prestored map information).

Further, the friction coefficient may be obtained based a detected value detected by, for example, a road surface sensor.

(5) The engine controlling apparatus according to any one of modes (1)-(4), wherein the behavior-representing physical amounts include at least one turning-behavior-representing physical amount representing the behavior of the vehicle upon turning of the vehicle, and wherein the allowing/inhibiting device includes a turning-behavior-basis allowing/inhibiting portion that is configured to selectively allow and inhibit the execution of the at least one of (i) the engine automatic stop control and (ii) the engine automatic restart control, by comparing each of the at least one turning-behavior-representing physical amount, with the threshold value which is determined for the each of the at least one turning-behavior-representing physical amount.

The execution of the above-described at least one of the engine automatic atop control and the engine automatic restart control may be inhibited when the turning-behavior-representing physical amount is not smaller than the threshold value, and may be allowed when the turning-behavior-representing physical amount is smaller than the threshold value.

(6) The engine controlling apparatus according to mode (5), wherein the allowing/inhibiting device includes a running-velocity-basis threshold-value determiner that is configured to determine the threshold value such that the determined threshold value is smaller when the running velocity of the vehicle is high than when the running velocity of the vehicle is low.

As described above, the behavior of the vehicle is more likely to be unstable due to the automatic stop or restart of the engine when the turning-behavior-representing physical amount is large than when the turning-behavior-representing physical amount is small. Further, even without change of the turning-behavior-representing physical amount, the behavior of the vehicle is more likely to be unstable when the running velocity of the vehicle is high, than when the running velocity is low. In view of this, it is appropriate that the threshold value is set to a smaller value when the running velocity is high than when the running velocity is low, and that the automatic stop and restart of the engine is inhibited when the turning-behavior-representing physical amount is larger than the threshold value.

(7) The engine controlling apparatus according to mode (5) or (6), wherein the allowing/inhibiting device includes a hysteresis-based allowing/inhibiting portion which is configured to inhibit the execution of the at least one of (i) the engine automatic stop control and (ii) the engine automatic restart control when the at least one turning-behavior-representing physical amount is not smaller than an inhibiting threshold value as the threshold value, and which is configured to allow the execution of the at least one of (i) the engine automatic stop control and (ii) the engine automatic restart control when the at least one turning-behavior-representing physical amount is not larger than an allowing threshold value that is smaller than the inhibiting threshold value.

The execution of the above-described at least one of the engine automatic stop control and the engine automatic restart control is inhibited when the turning-behavior-representing physical amount is not smaller than the inhibiting threshold value, and is allowed when the turning-behavior-representing physical amount is not larger than the allowing threshold value.

Thus, since the inhibiting threshold value for inhibiting the automatic stop and/or restart of the engine and the allowing threshold value for allowing the automatic stop and/or restart of the engine are different from each other, it is possible to avoid repeat of the automatic stop and restart of the engine. Further, since the automatic stop and/or restart of the engine is allowed after the turning-behavior-representing physical amount has become equal to or smaller than the allowing threshold value, it is possible to satisfactorily avoid the behavior from becoming unstable.

For example, the inhibiting threshold value may be set to a value such that the behavior is likely to become unstable due to the automatic stop or restart of the engine when the turning-behavior-representing physical amount is larger than the inhibiting threshold value. The allowing threshold value is set to a value which is smaller than the inhibiting threshold value with the running velocity being not changed.

It is noted that, when the turning-behavior-representing physical amount is not smaller than the inhibiting threshold value, (i) the automatic stop and restart of the engine may be both inhibited, (ii) the automatic stop and restart of the engine may be inhibited and allowed, respectively, and (iii) the automatic stop and restart of the engine may be allowed and inhibited, respectively.

(8) The engine controlling apparatus according to any one of modes (5)-(7), wherein the allowing/inhibiting device includes a time-elapse-based allowing/inhibiting portion which is configured to inhibit the execution of the at least one of (i) the engine automatic stop control and (ii) the engine automatic restart when the at least one turning-behavior-representing physical amount is not smaller than the threshold value, and is configured to allow the execution of the at least one of (i) the engine automatic stop control and (ii) the engine automatic restart control when an allowance waiting time elapses after the at least one turning-behavior-representing physical amount has become smaller than the threshold value.

The automatic stop and/or restart of the engine is inhibited when the turning-behavior-representing physical amount is not smaller than the threshold value, and is allowed when the predetermined length of time elapses after the turning-behavior-representing physical amount has become smaller than the threshold value. Thus, the automatic stop and/or restart of the engine is not allowed immediately after the turning-behavior-representing physical amount has become smaller than the threshold value, so that it is possible to satisfactorily avoid the behavior from becoming unstable.

It is noted that the allowance waiting time may be a length of time which is required until influence, which has affected the vehicle behavior as a result of increase of the turning-behavior-representing physical amount over the threshold value, becomes extremely small or becomes substantially zero.

Further, the allowance waiting time may be either a predetermined fixed length of time or a length of time that is determined depending on the turning-behavior-representing physical amount. For example, the allowance waiting time may be a length of time which is larger when the absolute value of the steering angle or the absolute value of the yaw rate is large than when the absolute value of the steering angle or the absolute value of the yaw rate is small.

(9) The engine controlling apparatus according to any one of modes (1)-(8), wherein the plurality of physical amounts are different in kind from each other, and wherein the allowing/inhibiting device includes a physical amount changer configured to change, depending on state of running the vehicle, each of the at least one of the plurality of physical amounts, from a selected one of the plurality of physical amounts to another selected one of the plurality of physical amounts.

The state of the vehicle in which the vehicle behavior is likely to be unstable due to the automatic stop and restart of the engine during running of the vehicle at a high velocity is not necessarily the same as the state of the vehicle in which the vehicle behavior is likely to be unstable due to the automatic stop and restart of the engine during running of the vehicle at a low velocity. Further, the state of the vehicle in which the vehicle behavior is likely to be unstable due to the automatic stop and restart of the engine during turning of the vehicle is not necessarily the same as the state of the vehicle in which the vehicle behavior is likely to be unstable due to the automatic stop and restart of the engine during straight running of the vehicle. Moreover, the state of the vehicle in which the vehicle behavior is likely to be unstable due to the automatic stop and restart of the engine during deceleration or acceleration of the vehicle is not necessarily the same as the state of the vehicle in which the vehicle behavior is likely to be unstable due to the automatic stop and restart of the engine during running of the vehicle at a constant velocity. In view of this, it is appropriate that each of the at least one of the plurality of physical amounts, which is used to determine whether the automatic stop and/or restart of the engine should be allowed or inhibited, is a selected one of the plurality of physical amounts that are different in kind from each other, which is selected depending on state of running of the vehicle.

(10) The engine controlling apparatus according to mode (9), wherein the physical amount changer is configured to change each of the at least one of the plurality of physical amounts, such that one of the plurality of physical amounts which is selected when the running velocity of the vehicle is higher than a first predetermined running velocity and another one of the plurality of physical amounts which is selected when the running velocity is lower than the first predetermined running velocity, are different in kind from each other.

(11) The engine controlling apparatus according to mode (9) or (10), wherein the physical amount changer is configured to employ, as the at least one of the plurality of physical amounts, at least one low-running-velocity physical amount which is selected from the plurality of physical amounts, when the running velocity of the vehicle is lower than a second predetermined velocity, and wherein the physical amount changer is configured to employ, as the at least one of the plurality of physical amounts, at least one high-running-velocity physical amount which is selected from the plurality of physical amounts and which is different from the at least one low-running-velocity physical amount, when the running velocity is not lower than the second predetermined velocity.

(12) The engine controlling apparatus according to any one of modes (9)-(11), wherein the behavior-representing physical amounts include (a-1-1) at least one turning-behavior-representing physical amount representing the behavior of the vehicle upon turning of the vehicle and (a-1-2) at least one braking-behavior-representing physical amount representing the behavior of the vehicle upon braking of the vehicle, wherein the physical amount changer is configured to employ (a-1-2) the at least one braking-behavior-representing physical amount as the at least one of the plurality of physical amounts, when the running velocity of the vehicle is lower than a third predetermined velocity, and wherein the physical amount changer is configured to employ (a-1-1) the at least one turning-behavior-representing physical amount as the at least one of the plurality of physical amounts, when the running velocity of the vehicle is not lower than the third predetermined velocity.

For example, although the vehicle runs normally, in most cases, during running of the vehicle at a high velocity, the turning behavior is likely to become unstable when a steering operation is carried out at a high velocity. On the other hand, during running of the vehicle at a low velocity, although the vehicle is frequently accelerated and decelerated, in most cases, the turning behavior is unlikely to become unstable even when the steering operation is carried out at a high velocity. In view of these, it is desirable that the automatic stop and/or restart of the engine is selectively allowed and inhibited based on the turning-behavior-representing physical amount during running of the vehicle at a high velocity and that the automatic stop and/or restart of the engine is selectively allowed and inhibited based on the braking-behavior-representing physical amount during running of the vehicle at a low velocity. During running at a low velocity, there is a low need for consideration of instability of the vehicle behavior, so that the automatic stop and/or restart of the engine can be selectively allowed and inhibited, by focusing on an intention of the vehicle operator with respect to braking the vehicle.

The third predetermined velocity (that may be referred also to as "physical-amount switching velocity" or "judging velocity") serves to determine whether the vehicle is running at a high velocity or at a low velocity. This third predetermined velocity may be set to a value such that the turning behavior is likely to become unstable when the running velocity is not lower than this value as the third predetermined velocity, or a value that is higher than this value. Further, the third predetermined velocity may be set to a value such that it can be regarded that the vehicle is running at a high velocity (for example, on a suburban road or a highway road) when the running velocity is not lower than this value as the third predetermined velocity. For example, the physical-amount switching velocity may be set to a value ranging from 30 km/h to 40 km/h. Further, the physical-amount switching velocity may be a value variable depending on, for example, friction coefficient of the road surface, such that the physical-amount switching velocity is lower during running of the vehicle on a road surface having a low friction coefficient $\mu$ than during running of the vehicle on a road surface having a high friction coefficient $\mu$.

Each of the at least one physical amount may be changed twice or more than twice during running of the vehicle at a velocity that ranges in a normal velocity range.

Further, the automatic stop and/or restart of the engine may be selectively allowed and inhibited based on two or more physical amounts during running of the vehicle at a high velocity, and may be selectively allowed and inhibited based on at least one physical amount during running of the vehicle at a low velocity.

(13) The engine controlling apparatus according to any one of modes (1)-(12), wherein the allowing/inhibiting device is configured to selectively allow and inhibit the execution of the at least one of (i) the engine automatic stop control and (ii) the engine automatic restart control, by comparing each of at least one of the behavior-representing physical amounts, with the threshold value which is determined for the each of the at least one of the behavior-representing physical amounts, wherein the at least one of the behavior-representing physical amounts includes (a-1-1) at least one turning-behavior-representing physical amount representing the behavior of the vehicle upon turning of the vehicle and (a-1-2) at least one braking-behavior-representing physical amount representing the behavior of the vehicle upon braking of the vehicle, wherein the allowing/inhibiting device includes a running-velocity-based allowing/inhibiting portion, and wherein the running-velocity-based allowing/inhibiting portion is configured to inhibit the execution of the at least one of (i) the engine automatic stop control and (ii) the engine automatic restart control, when the running velocity of the vehicle is not lower than a fourth predetermined velocity with each of the at least one turning-behavior-representing physical amount being larger than the threshold value which is determined for the each of the at least one turning-behavior-representing physical amount, and when the running velocity of the vehicle is lower than the fourth predetermined velocity with a currently generated braking force indicated by each of the at least one braking-behavior-representing physical amount being smaller than a reference braking force indicated by the threshold value which is determined for the each of the at least one braking-behavior-representing physical amount.

When the running velocity of the vehicle is lower than the fourth predetermined velocity, the execution of the at least one the engine automatic stop control and engine automatic restart control is selectively allowed and inhibited based on the at least one braking-behavior-representing physical amount, i.e., based on an intention of the vehicle operator with respect to braking the vehicle.

(i) When the currently generated braking force indicated by each of the at least one braking-behavior-representing physical amount is smaller than the reference braking force indicated by the threshold value, it is preferable that the automatic stop of the engine is inhibited, because there is no intention (weak intention) of the vehicle operator to stop running of the vehicle in this case. Further, in this case, both the automatic stop and restart of the engine may be inhibited, because the operator could be frustrated if the automatic stop and restart of the engine take place repeatedly. The term "the currently generated braking force is smaller than the reference braking force" may be interpreted to mean that a current deceleration is lower than a reference deceleration, an operating force currently applied to brake the vehicle is smaller than a reference operating force, or a pressing force currently applied from a friction member to a brake rotary body is smaller than a reference pressing force.

(ii) When the currently generated braking force indicated by each of the at least one braking-behavior-representing physical amount is larger than the reference braking force indicated by the threshold value, it is preferable that the automatic stop of the engine is allowed, because there is strong intention of the vehicle operator to stop running of the vehicle in this case. That is, in this case, the automatic stop of the engine is in conformity with the invention of the operator. Further, in this case, both the automatic stop and restart of the engine may be allowed, because it is preferable that the engine is restarted when a negative pressure currently generated by a vacuum booster is closer to an atmospheric pressure than a predetermined pressure.

It is noted that at least two of the first through fourth predetermined velocities may be set to respective values which are either different from each other or equal to each other. Further, each of the first through fourth predetermined velocities may be either a fixed value or a variable value.

(14) The engine controlling apparatus according to any one of modes (1)-(13), wherein the allowing/inhibiting device includes a composed allowing/inhibiting portion that is configured to selectively allow and inhibit the execution of the at least one of (i) the engine automatic stop control and (ii) the engine automatic restart control, based on a result of comparison of a first physical amount that is a selected one of the plurality of physical amounts, with the threshold value which is determined for the first physical amount, and based on a result of comparison of a second physical amount that is another selected one of the plurality of physical amounts, with the threshold value which is determined for the second physical amount.

For example, the automatic stop and/or restart of the engine may be inhibited, when the absolute value of the steering velocity is higher than the threshold value (steering-velocity-based threshold value) that is determined depending on the running velocity of the vehicle, with the friction coefficient of the road surface being lower than the threshold value (road-surface-friction-coefficient-based threshold value), so that the automatic stop and/or restart of the engine can be allowed when the friction coefficient of the road surface is higher than the road-surface-friction-coefficient-based threshold value even with the absolute value of the steering velocity being higher than the steering-velocity-based threshold value. This is because there is low possibility that the vehicle behavior becomes unstable when the friction coefficient of the road surface is high even if the absolute value of the steering velocity is high.

Further, the automatic stop and/or restart of the engine may be inhibited, when the absolute value of the steering velocity is higher than the steering-velocity-based threshold value, with the absolute value of the steering amount being larger than the threshold value (steering-amount-based threshold value) that is determined depending on the running velocity of the vehicle, so that the automatic stop and/or restart of the engine can be allowed when the absolute value of the steering amount is smaller than the steering-amount-based threshold even with the absolute value of the steering velocity being higher than the steering-velocity-based threshold value. This is because it is difficult for the vehicle behavior to become unstable when the absolute value of the steering amount is small even if the absolute value of the steering velocity is high.

Further, the automatic stop and/or restart of the engine may be inhibited when at least one of two conditions is satisfied, i.e., when the absolute value of the steering velocity is higher than the steering-velocity-based threshold value and/or the absolute value of the steering amount is larger than the steering-amount-based threshold value. This arrangement makes it possible to further improve the stability of the vehicle.

While there have been described arrangements in which the automatic stop and/or restart of the engine is selectively allowed and inhibited based on a combination of the absolute value of the steering velocity and the friction coefficient of the road surface or based on a combination of the absolute value of the steering velocity and the absolute value of the steering amount, it is also possible to selectively allow and inhibit the automatic stop and/or restart of the engine based on a combination of two physical amounts each of which is one of the behavior-representing physical amounts or one of the turning-behavior-influencing physical amounts. Further, the automatic stop and/or restart of the engine is selectively allowed and inhibited based on a combination of three or more than three physical amounts each of which is one of the behavior-representing physical amounts or one of the turning-behavior-influencing physical amounts. Further, one of the physical amounts constituting each of these combinations may be a booster negative pressure.

(15) The engine controlling apparatus according to any one of modes (1)-(14), wherein the allowing/inhibiting device includes a learning-basis threshold-value determiner that is configured to determine the threshold value, based on a number of times the execution of the at least one of (i) the engine automatic stop control and (ii) the engine automatic restart control has been inhibited.

In terms of improvement in fuel efficiency, it is not desirable that the automatic stop or restart of the engine is inhibited a large number of times. Therefore, when the number of times the execution of at least one of the engine automatic stop control and engine automatic restart control has been inhibited during a predetermined length of past time or during a length of time from a reference point of time to a current point of time, is not smaller than a predetermined number of times, the threshold value may be changed to a value that reduces the number of times of inhibition of the automatic stop or restart of the engine.

It is noted that a plurality of threshold values (i.e., a plurality of tables each representing a relationship between the threshold value and the running velocity) may be prestored so that one of the threshold values can be selected based on the number of times of inhibition of the execution of at least one of the engine automatic stop control and engine automatic restart control.

(16) The engine controlling apparatus according to any one of modes (3)-(15), wherein the allowing/inhibiting device includes a fuel-efficiency-basis threshold-value determiner that is configured to determine the threshold value, based on at least one of an actual fuel efficiency and a fuel efficiency that is demand by an operator of the vehicle.

For example, when the automatic stop and/or restart of the engine is inhibited with the turning-behavior-representing physical amount being larger than the threshold value, the fuel efficiency can be improved by increasing the threshold value with respect to each running velocity level of the vehicle, because it is possible to reduce opportunities to inhibit the automatic stop and restart of the engine, by increase of the threshold value. On the other hand, running stability of the vehicle can be improved by reducing the threshold value with respect to each running velocity level.

For example, when there is a demand of the vehicle operator to improve the fuel efficiency (when the fuel efficiency demand is strong), the threshold value may be increased to become larger than a current value so that the automatic stop and/or restart of the engine become less likely to be inhibited. On the other hand, when there is no demand of the vehicle operator to improve the fuel efficiency (when the fuel efficiency demand is weak), the threshold value may be reduced to become smaller than a current value.

Further, when it is determined that an actual fuel efficiency is worse (i.e., lower) than a standard fuel efficiency that is dependent on type of the vehicle, by a predetermined value or more, as a result of comparison between the actual fuel efficiency and the standard fuel efficiency, the threshold value may be increased.

Thus, it is possible to determine the threshold value, on the basis of learning that is made based on, for example, an actual fuel efficiency.

(17) An engine controlling apparatus for executing, during running of a vehicle, at least one of (i) an engine automatic stop control for automatically stopping an engine of the vehicle and (ii) an engine automatic restart control for automatically restarting the engine, the engine controlling apparatus comprising:

an engine automatic stop/restart device configured to execute each of the at least one of (i) the engine automatic stop control and (ii) the engine automatic restart control, when a corresponding one of an engine stop condition and an engine restart condition is satisfied, each of at least one of the engine stop condition and the engine restart condition includes at least a requirement that a turning-behavior-representing physical amount representing behavior of the vehicle upon turning of the vehicle is smaller than a threshold value which is determined depending on a running velocity of the vehicle.

The engine stop condition includes:

(i) a requirement that the turning-behavior-representing physical amount is smaller than a threshold value which is determined depending on the vehicle running velocity; and (ii) at least one of (a) a requirement that there is no intention of the vehicle operator to accelerate the vehicle (for example, a requirement that an acceleration opening degree is not larger than a predetermined value or a requirement that the acceleration opening degree is kept to be not larger than the predetermined value over at least a predetermined length to time), (b) a requirement that the vehicle is running at a constant velocity, (c) a requirement that a road surface on which the vehicle is running has an inclination whose degree is not larger than a predetermined value, and (d) a requirement that the running velocity of the vehicle is not higher than a predetermined value.

Thus, it is determined that the engine stop condition is satisfied when the requirement (i) and at least one of the requirements (ii-a, ii-b, ii-c, ii-d) are satisfied.

The engine restart condition includes:

(i) a requirement that the turning-behavior-representing physical amount is smaller than a threshold value which is determined depending on the vehicle running velocity; and (ii) at least one of (x) a requirement that the acceleration opening degree is not smaller than a predetermined value, (y) a requirement that the negative pressure is closer to an atmospheric pressure than a predetermined pressure, and (z) a requirement that the state of running of the vehicle is changed.

Thus, it is determined that the engine restart condition is satisfied when the requirement (i) and at least one of the requirements (ii-x, ii-y, ii-z) are satisfied.

It is possible to employ technical features described in any one of the above modes (1)-(16), in the engine controlling apparatus described in this mode (17).

(18) An engine controlling apparatus for executing, during running of a vehicle, at least one of (i) an engine automatic stop control for automatically stopping an engine of the vehicle and (ii) an engine automatic restart control for automatically restarting the engine, the engine controlling apparatus comprising:

an allowing/inhibiting device configured to selectively allow and inhibit execution of the at least one of (i) the engine automatic stop control and (ii) the engine automatic restart control, by comparing each of at least one running-related physical amount each related to running of the vehicle, with a threshold value which is determined, depending on a running velocity of the vehicle, for the each of the at least one running-related physical amount.

Each of the at least one running-related physical amount may be not only the above-described behavior-representing physical amount or turning-behavior-influencing physical amount but may be a braking-behavior-influencing physical amount (e.g., booster negative pressure) influencing behavior of the vehicle upon braking of the vehicle.

It is possible to employ technical features described in any one of the above modes (1)-(17), in the engine controlling apparatus described in this mode (18).

(19) An engine controlling apparatus for executing, during running of a vehicle, at least one of (i) an engine automatic stop control for automatically stopping an engine of the vehicle and (ii) an engine automatic restart control for automatically restarting the engine, the engine controlling apparatus comprising:

an allowing/inhibiting device configured to selectively allow and inhibit execution of the at least one of (i) the engine automatic stop control and (ii) the engine automatic restart control, by comparing each of at least one of (a) a plurality of physical amounts including (a-1) behavior-representing physical amounts each representing behavior of the vehicle and (a-2) behavior-influencing physical amounts each influencing the behavior of the vehicle, with (b) a threshold value which is determined for the each of the at least one of the plurality of physical amounts, wherein each of the at least one of the plurality of physical amounts is a selected one of the plurality of physical amounts that are different in kind from each other, and wherein the allowing/inhibiting device includes a physical amount changer configured to change, depending on a running velocity of the vehicle, the each of the at least one of the plurality of physical amounts, from a selected one of the plurality of physical amounts to another selected one of the plurality of physical amounts.

The automatic stop and/or restart of the engine is selectively allowed or inhibited by comparing each of the at least one of the plurality of physical amounts, with the threshold value. Each of the at least one of the physical amounts is changed based on the running velocity. The threshold value determined for each of the at least one of the physical amounts does not necessarily have be a value determined depending on the vehicle running velocity.

It is possible to employ technical features described in any one of the above modes (1)-(18), in the engine controlling apparatus described in this mode (19).

DETAILED DESCRIPTION OF THE PREFERRED EMBODIMENTS

There will be described some embodiments of the invention, by reference to the accompanying drawings.

Hereinafter, there will be first described a construction that is common to the plurality of embodiments of the invention.
[Construction and Effect Common to Plurality of Embodiments]

Figure 1:
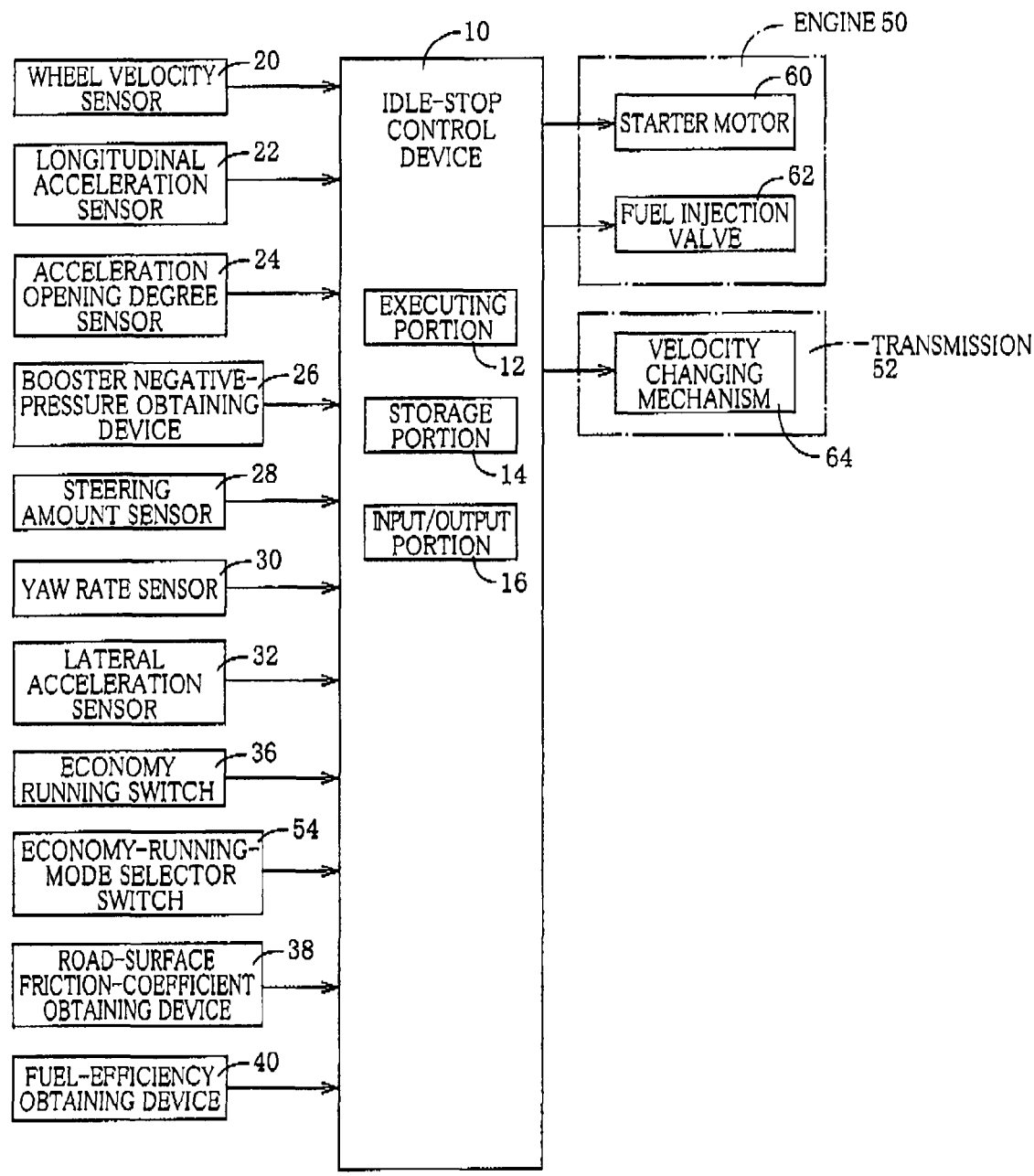
FIG. 1 is a view showing an engine controlling apparatus that is common to a plurality of embodiments of the present invention.

As shown in FIG. 1, an engine controlling apparatus is installed in a vehicle having a drive source in the form of an engine. The engine controlling apparatus includes an idle-stop control device 10, which is constituted principally by a computer and includes an executing portion 12, a storage portion 14 and an input/output portion 16.

To the input/output portion 16, there are connected wheel velocity sensors 20, a longitudinal acceleration sensor 22, an acceleration opening degree sensor 24, a booster negative-pressure obtaining device 26, a steering amount sensor 28, a yaw rate sensor 30, a lateral acceleration sensor 32, an economy running switch 36, a road-surface friction-coefficient obtaining device 38, a fuel-efficiency obtaining device 40, an engine 50, a transmission 52 and other components.

Each of the wheel velocity sensors 20 is provided for a corresponding one of front right, front left, rear right and rear left wheels of the vehicle, and is configured to detect a rotational velocity of the corresponding wheel. A running velocity of the vehicle can be obtained based on the detected rotational velocities of the respective front right, front left, rear right and rear left wheels.

The longitudinal acceleration sensor 22 is provided for detecting an acceleration of the vehicle in a longitudinal direction of the vehicle, and is configured to detect the longitudinal acceleration of the vehicle, based on an inertial force acting on the vehicle in the longitudinal direction.

The acceleration opening degree sensor 24 is provided for detecting an amount of operation of an accelerator pedal (not shown). Based on a value detected by the acceleration opening degree sensor 24, it is possible to know whether there is an intension of an operator of the vehicle to accelerate the vehicle and also a degree of the operator's intention to accelerate the vehicle.

The booster negative-pressure obtaining device 26 is provided for obtaining a pressure within a negative pressure chamber of a vacuum booster (not shown). The booster negative-pressure obtaining device 26 may include a booster negative pressure sensor configured to detect directly the pressure of the negative pressure chamber of the vacuum booster, or a booster-negative-pressure estimating device configured to estimate the pressure of the negative pressure chamber, based on an operational state of the engine 50 and an operational state of a brake operating member (not shown).

The steering amount sensor 28 is provided for detecting a steering amount of a steering operation member, and may be, for example, an operating angle sensor configured to detect a steering angle of a steering wheel as the steering operation member, so that the steering amount measured from a reference neutral position can be obtained based on a value detected by the steering amount sensor 28. The steering amount detected by the steering amount sensor 28 takes a value whose sign (positive/negative) varies depending on whether the steering operation member has been turned right or left. An absolute value of the steering amount (measured from the reference neutral position) is increased with increase of the steering amount, irrespective of whether the steering operation member has been turned right or left.

The yaw rate sensor 30 is a sensor configured to detect velocity of turning of the vehicle about a vertical axis. The detected value is represented by a value whose sign (positive/negative) varies depending on whether the vehicle turns right or left. An absolute value of the detected value is increased with increase of an absolute value of the turning velocity, irrespective of whether the vehicle turns right or left.

The economy running switch 36 is a switch (which may be constituted by, for example, a touch panel) operable by the vehicle operator, and is placed in its ON state when execution of an idle-stop control is desired by the operator. Further, when the execution of the idle-stop control is desired, in addition to placement of the economy running switch 36 in its ON state, it is possible to select a stability weighting mode for giving weighting to the stability or a fuel-efficiency weighting mode for giving weighting to the fuel efficiency, by operation of an economy-running-mode selector switch 54. It is noted that provisions of the economy running switch 36 and economy-running-mode selector switch 54 are not essential.

The road-surface friction-coefficient obtaining device 38 is provided for obtaining a friction coefficient of a road surface on which the vehicle is running. For example, the road-surface friction-coefficient obtaining device 38 may be configured to obtain the friction coefficient of the road surface, based on at least one of a road surface information (weather information) obtained via a communication, a prestored map information and an information representing a location in which the vehicle is currently located. Further, the road-surface friction-coefficient obtaining device 38 does not necessarily have to be configured to obtain a value of the friction coefficient, but may be configured to determine simply whether the road surface has a high friction coefficient or a low friction coefficient.

The fuel-efficiency obtaining device 40 is provided for obtaining an actual value of the fuel efficiency, and is configured to obtain the actual value of the fuel efficiency in the form of a running distance (km/L) per unit fuel consumption, based on a fuel consumption amount and an accumulated running distance during a predetermined length of past time or during a time from a reference point of time (at which the vehicle was refueled) to a current point of time.

The engine 50 includes a starter motor 60 and a fuel injection valve 62, which are to be controlled for automatically stopping or restarting the engine 50. The transmission 52 includes a velocity changing mechanism 64 which is to be controlled together with control of the starter motor 60 and fuel injection valve 62.

The storage portion 14 stores therein tables and programs, for example, so that the programs can be executed by the executing portion 12 with utilization of the tables, whereby the engine 50 is selectively stopped or restarted automatically.

The engine 50 is automatically stopped or restarted when the economy running switch 36 is placed in its ON state and the vehicle is running.

It is regarded that the vehicle is running, when an actual running velocity v is not lower than a predetermined velocity voth. This predetermined velocity voth may be, for example, (a) a velocity higher than a value which makes it possible to judge that the vehicle is in its stopped state, (b) a velocity that is minimumly required for each wheel velocity sensor 20 to detect the running of the vehicle, or (c) a velocity that causes a possibility that the behavior (particularly, turning behavior) of the vehicle becomes unstable. Further, the predetermined velocity voth may be a value selected from a range of 1.3 km/h, a value of about 10 km/h, a value selected from a range of 30.40 km/h or a value not lower than 40 km/h. Further, the predetermined velocity voth may be a value variable depending on the friction coefficient of the road surface on which the vehicle is running, because the running velocity causing the behavior to be problematic tends to be lower during running of the vehicle on the road surface having a low friction coefficient than during running of the vehicle on the road surface having a high friction coefficient. This predetermined velocity voth may referred to as "running judgment velocity" or "economy-running mode velocity".

In principle, the engine 50 is automatically stopped when an engine stop condition is satisfied, and is automatically restarted when an engine restart condition is satisfied.

The engine stop condition includes two requirements consisting of (a) a requirement that there is no intention of the vehicle operator to accelerate the vehicle (for example, a requirement that an acceleration opening degree is not larger than a predetermined value or is zero) and (b) a requirement that a road surface on which the vehicle is running has a slope (inclination angle) whose degree is not larger than a predetermined value. Thus, it is regarded that the engine stop condition is satisfied when these conditions (a), (b) are satisfied.

When there is no intention of the vehicle operator to accelerate the vehicle, the engine 50 can be stopped without any inconvenience.

Further, during running of the vehicle on a downhill, when the inclination angle is large, it is not desirable to stop the engine 50 because it is desirable that an engine brake is in effect. However, when the inclination angle is small, the engine 50 can be stopped without any inconvenience because there is a low need for the engine brake.

During running of the vehicle on an uphill, when the inclination angle is large, it is desirable to not stop the engine 50 for preventing backward movement of the vehicle. However, when the inclination angle is small, the engine 50 can be stopped without any inconvenience because there is a low need for prevention of backward movement of the vehicle.

The slope (inclination angle) of the road surface is obtained based on a value that is obtained by subtracting a longitudinal acceleration value Gv (dv/dt) (calculated with an assumption that the vehicle is running on a horizontal road surface) from an acceleration value Gs that is detected by the longitudinal acceleration sensor 22. When the vehicle is running on an uphill or a downhill, the acceleration value Gs detected by the longitudinal acceleration sensor 22 is equal to a sum of a value Gθ (whose sign varies depending on whether the vehicle is running on the downhill or uphill) of acceleration that acts on the vehicle based on the inclination angle of the road surface and the longitudinal acceleration value Gv (dv/dt) (whose sign varies depending on whether the vehicle is accelerated or decelerated) that is obtained by differentiating a running velocity value (obtained based on a value detected by each wheel velocity sensor 20) with respect to time.

$$Gs=Gv+G\theta$$

For example, the acceleration value may be represented by a positive value in case of acceleration of the vehicle, and the slope of the road surface may be represented by a positive value in case of running of the vehicle on a downhill.

Therefore, the value G0 of acceleration acting on the vehicle based on the inclination angle of the road surface can be obtained in accordance with the following expression:

$$G\theta=Gs-Gv$$

The inclination angle $\theta$ can be obtained based on the value G$\theta$ of acceleration, which acts on the vehicle based on the inclination angle of the road surface $\{\theta=\arcsin(G\theta/g)\}$.

Thus, the above-described requirement (b) is satisfied when an absolute value $|\theta|$ of the inclination angle $\theta$ is not larger than a predetermined value (i.e., when the slope is not larger than a predetermined slope).

When the engine stop condition is satisfied as a result of satisfaction of the requirements (a), (b), the idle-stop control device 10 stops supply of the fuel to the engine 50, for example, by controlling the fuel injection valve 62, for thereby stopping the engine 50. Further, the transmission 52 is placed in its non-transmitting state, by controlling the velocity changing mechanism 64.

During running of the vehicle, it is common that a shift operation member (not shown) is placed in a drive position as its operating position. In the present embodiment, in principle, the engine 50 is automatically stopped when the requirements (a), (b) are satisfied even if the operation member is being placed in the drive position.

Further, as described later, the engine stop condition may either include or not include (c) a requirement that the automatic stop of the engine 50 is not inhibited. That is, the requirement that the automatic stop of the engine 50 is not inhibited may be considered either as a part included in the engine stop condition or as a part not included in the engine stop condition.

The engine restart condition includes two requirements consisting of (x) a requirement that a booster negative pressure is closer to an atmospheric pressure than a predetermined pressure and (y) a requirement that there is no intention of the vehicle operator to accelerate the vehicle (i.e., a requirement that an acceleration opening degree is not larger than a predetermined value). It is regarded that the engine restart condition is satisfied when at least one of the two requirements is satisfied.

When the booster negative pressure is closer to the atmospheric pressure than the predetermined pressure, it is not possible to obtain a sufficient pressing force upon activation of a friction braking system (not shown). It is therefore desirable to activate the engine 50 so as to cause the booster negative pressure to be closer to a vacuum pressure.

Further, when there is an intention of the vehicle operator to accelerate the vehicle, it is desirable to activate the engine 50.

When the engine restart condition is satisfied, the idle-stop control device 10 starts the starter motor 60 and supplies the fuel to the engine 50, for example, by controlling the fuel injection valve 62, whereby the engine 50 is restarted. Further, the transmission 52 is placed into its transmitting state by controlling the velocity changing mechanism 64.

Further, as described later, the engine restart condition may either include or not include a requirement that the automatic restart of the engine 50 is not inhibited. That is, the requirement that the automatic restart of the engine 50 is not inhibited may be considered either as a part included in the engine restart condition or a part not included in the engine restart condition.

Embodiment 1

Figure 2:
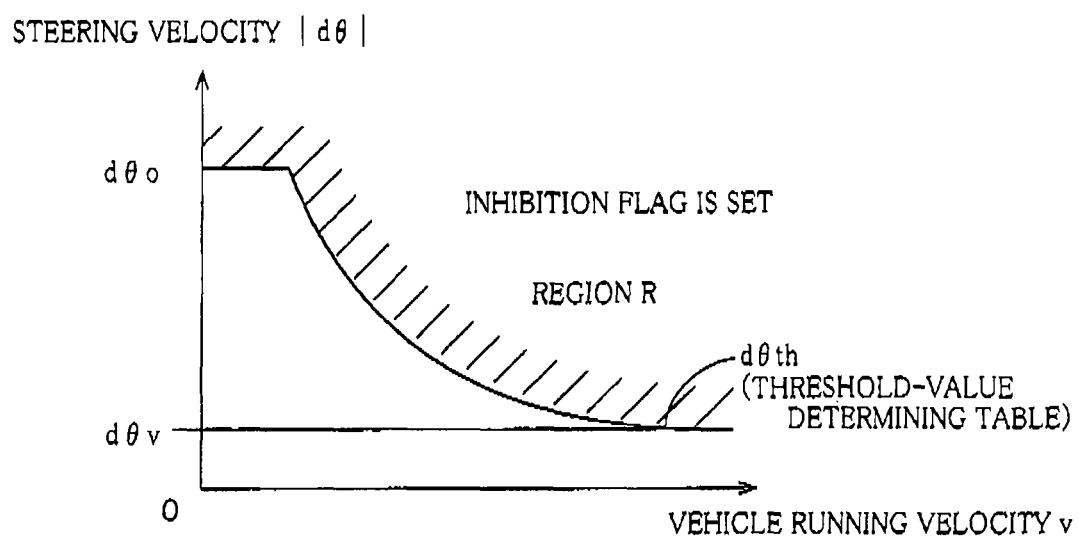
FIG. 2 is a map representing a threshold-value determining table stored in a storage portion of the engine controlling apparatus according to an embodiment 1 of the invention.
Figure 3:
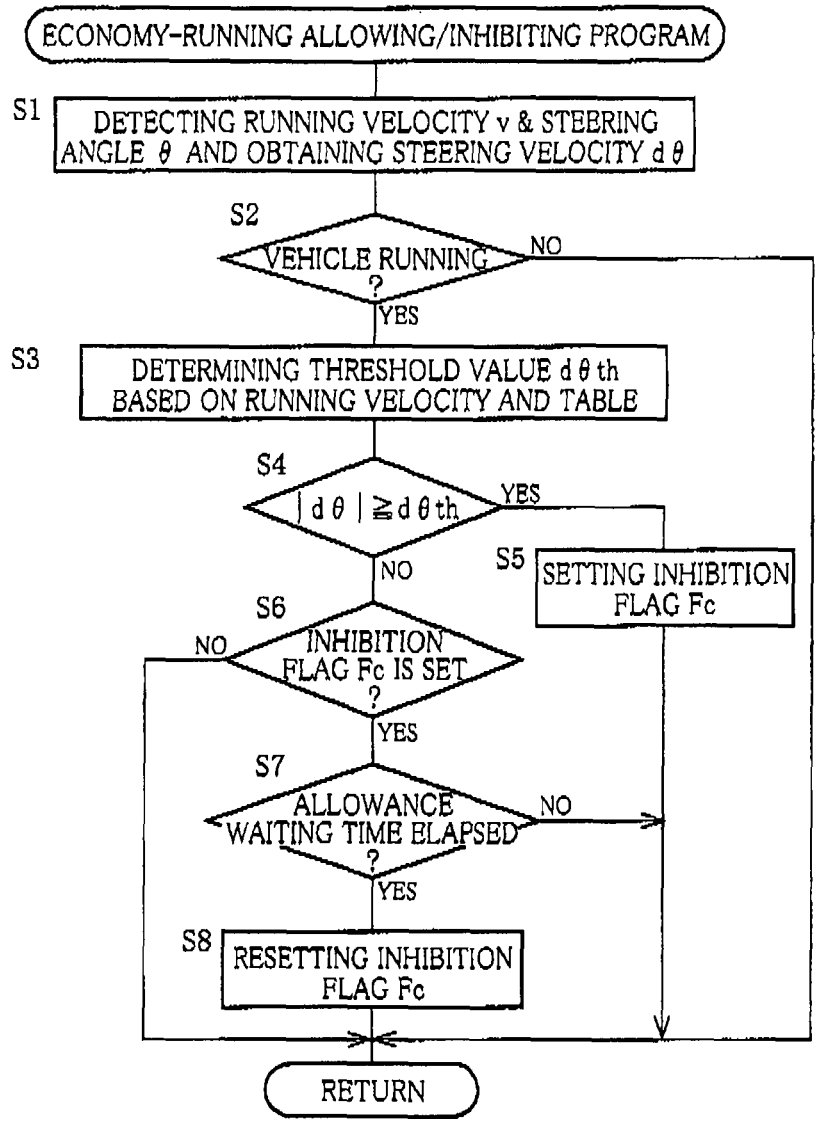
FIG. 3 is a view representing a flow chart of an economy-running allowing/inhibiting program stored in the above-described storage portion of the engine controlling apparatus according to the embodiment 1.
Figure 4:
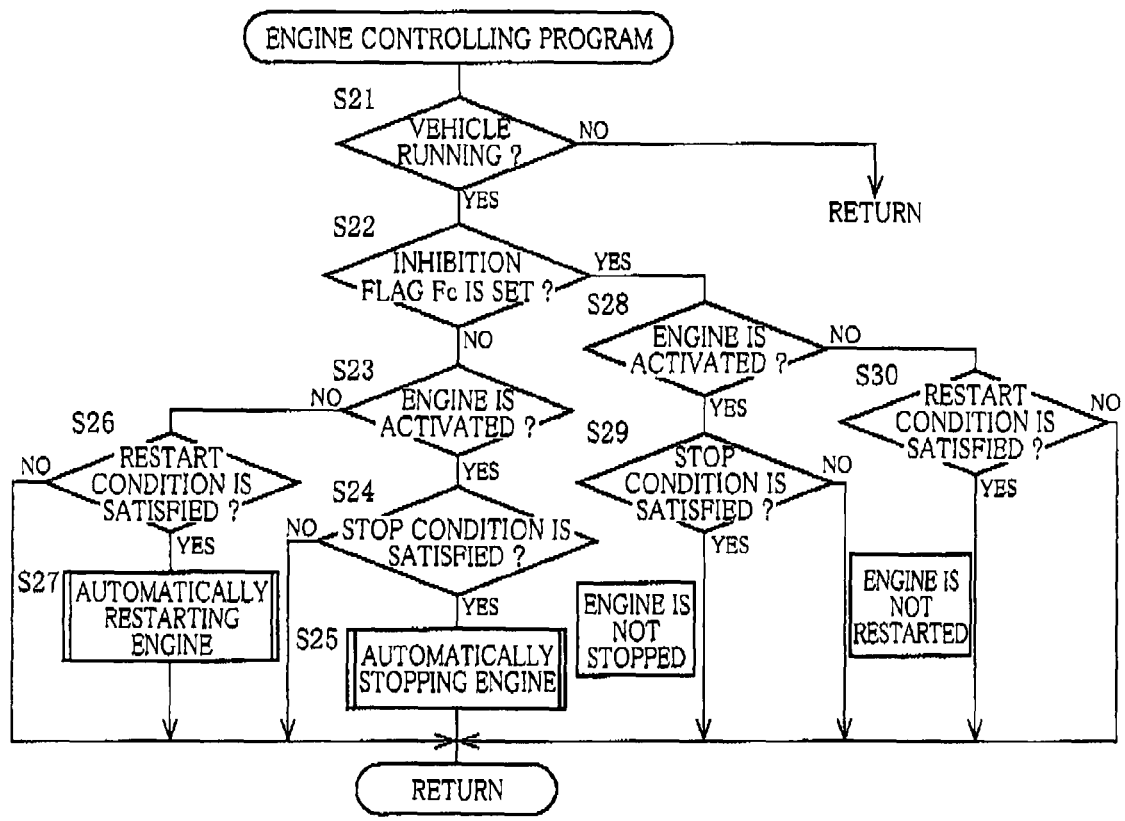
FIG. 4 is a flow chart of an engine controlling program stored in the above-described storage portion of the engine controlling apparatus according to the embodiment 1.

In the engine controlling apparatus constructed according to the embodiment 1, the storage portion 14 of the idle-stop control device 10 stores therein, for example, a threshold-value determining table represented by a map of FIG. 2, an economy-running allowing/inhibiting program represented by a flow chart of FIG. 3 and an engine controlling program represented by a flow chart of FIG. 4.

During turning of the vehicle, a longitudinal force acting in a longitudinal direction of the vehicle and a lateral force acting in a lateral direction are applied from the road surface to each tire of the vehicle, namely, a resultant force which is composed of a longitudinal force component and a lateral force component is applied from the road surface to each tire. In this state, when the engine 50 is automatically stopped or restarted, magnitude of the longitudinal force component is changed whereby the resultant force acting on the tire is changed in magnitude and direction so that there is a possibility that the behavior of the vehicle could become unstable.

Further, when the engine 50 is stopped during turning of the vehicle, a spinning tendency could be increased due to a load movement.

For example, the behavior of the vehicle is more likely to become unstable due to the automatic stop or restart of the engine 50 when an absolute value of a steering velocity d$\theta$ as a turning-behavior-representing physical amount is large, than when the steering velocity d$\theta$ is small. The steering velocity d$\theta$ is, more precisely, an amount d$\theta$/dt of change of a value (steering angle) $\theta$ detected by the steering amount sensor 28 with respect to time. The steering velocity may be considered as a steering angle velocity, for example. Further, even without change of the absolute value of the steering velocity d$\theta$, the behavior of the vehicle is more likely to become unstable due to the automatic stop or restart of the engine 50 when a running velocity v of the vehicle is high, than when the running velocity v is low.

In view of this, in the embodiment 1, as shown in FIG. 2, a threshold value d$\theta$th, which is to be used for determining whether the automatic stop and restart of the engine 50 are to be allowed or inhibited, is set to a value that is smaller when the vehicle running velocity v is high than when the running velocity v is low. The threshold value d$\theta$th may be a value that is reduced sharply with increase of the running velocity v, because the absolute value of the steering velocity d$\theta$ that makes the behavior unstable can be approximated by a function of the running velocity v, i.e., k×1/v or k×1/v$^2$ (where "k" represents a factor).

Further, the threshold value d$\theta$th may be a value that is held constant in a range in which the running velocity v is low. The constant value may be a steering velocity d$\theta$o such that, even when the running velocity v is low, the behavior is very likely to become unstable if the steering operation member is operated at a velocity not lower than this steering velocity d$\theta$o.

Further, the threshold value d$\theta$th may be a value that is held constant even in a range in which the running velocity v is high. The constant value may be a steering velocity d$\theta$v such that, even when the running velocity v is high, the behavior is unlikely to become unstable or cannot become unstable as long as the steering operation member is operated at a velocity lower than this steering velocity d$\theta$v.

It is not essential that the threshold value dθth is held constant in a certain range of the running velocity v. The threshold value dθth may be a value that is continuously increased with increase of the running velocity v.

In the embodiment 1 as well as in the other embodiments, the threshold value dθth may be referred to as "steering-velocity-based threshold value", while a curve shown in FIG. 2 may be referred to as "steering-velocity-based-threshold-value determining table".

Further, hereinafter, in the present description, determining and changing the threshold-value determining table representing a relationship between the vehicle running velocity v and the threshold value will be simply referred to as determining and changing the threshold value dθth, respectively, where appropriate.

As shown in the map of FIG. 2, when the absolute value of the steering velocity dθ and the vehicle running velocity v both lie in a region R, i.e., when the absolute value |dθ| of the actual steering velocity is higher than the threshold value dθth that is determined depending on the running velocity v, a stop/restart inhibition flag Fc is set. This stop/restart inhibition flag Fc is a flag representing inhibition of the automatic stop and automatic restart of the engine 50. Thus, while the stop/restart inhibition flag Fc is being set, automatically stopping the engine 50 (that is being activated) and automatically restarting the engine 50 (that is being stopped) are both inhibited even when the engine stop condition and engine restart condition are satisfied. Consequently, it is possible to satisfactorily avoid the behavior of the vehicle from becoming unstable due to the automatic stop and/or restart of the engine 50.

The stop/restart inhibition flag Fc may be considered to be constituted by two flags that consist of an engine stop inhibition flag and an engine restart inhibition flag. Further, the stop/restart inhibition flag Fc may be referred to as "steering-velocity-based stop/restart inhibition flag". It is noted that the stop/restart inhibition flag Fc is simply referred to as "INHIBITION FLAG".

When the engine stop condition is satisfied, it is preferable to stop the engine 50, since the fuel efficiency can be improved by the automatic stop of the engine 50 during running of the vehicle.

In view of this, the stop/restart inhibition flag Fc (which has been set in the state of inhibition of the automatic stop and restart of the engine 50) is reset, after the absolute value |dθ| of the steering velocity dθ has become lower than the threshold value dθth and the influence over the behavior as a result of operation of the steering operation member at a velocity higher than the threshold value dθth has been eliminated, i.e., after an allowance waiting time has elapsed since the absolute value |dθ| of the steering velocity dθ had become lower than the threshold value dθth.

The allowance waiting time may be either a predetermined length of time or a length of time which is made larger when the absolute value |dθ| of the steering velocity dθ is high than when the absolute value |dθ| of the steering velocity dθ is low.

The economy-running allowing/inhibiting program represented by the flow chart of FIG. 3 is repeatedly executed at a predetermined time interval.

In step 1 (hereinafter simply referred to as "S1" as well as the other steps), the vehicle running velocity v and the steering amount θ are detected, and the steering velocity dθ is obtained by calculation based on the detected running velocity v and steering amount θ.

In S2, it is judged whether the vehicle is running or not, namely, it is judged whether the running velocity v is equal to or higher than a running judgment velocity voth. When the vehicle is running, S3 is implemented to determine the threshold value dθth based on the running velocity v and in accordance with the table of FIG. 2. In S4, it is judged whether the absolute value |dθ| of the actual steering velocity dθ is equal to or higher than the threshold value dθth. When the absolute value |dθ| of the actual steering velocity dθ is not lower than the threshold value dθth, S5 is implemented to set the stop/restart inhibition flag Fc.

As long as the absolute value |dθ| of the actual steering velocity dθ is not lower than the threshold value dθth, S1 through S5 are repeatedly implemented so that the automatic stop and restart of the engine 50 are inhibited.

On the other hand, when the absolute value |dθ| of the actual steering velocity de is lower than the threshold value dθth, a negative judgment is obtained in S4 whereby S6 is implemented to judge whether the stop/restart inhibition flag Fc is being set or not. When the stop/restart inhibition flag Fc is not being set, a negative judgment is obtained in S6 and the stop/restart inhibition flag Fc is kept reset. As long as the absolute value |dθ| of the steering velocity de is lower than the threshold value dθth, S1 through S4 and S6 are repeatedly implemented so that the stop/restart inhibition flag Fc is kept reset whereby the automatic stop and restart of the engine 50 are allowed.

When the absolute value |dθ| of the steering velocity de is lower than the threshold value dθth with the stop/restart inhibition flag Fc being kept set, S7 is implemented to judge whether the allowance waiting time has elapsed since a positive judgment had been obtained for the first time in S6. Until the allowance waiting time elapses, S1 through S4, S6 and S7 are repeatedly implemented so that the stop/restart inhibition flag Fc is kept set. Then, when the allowance waiting time has elapsed, S8 is implemented to reset the stop/restart inhibition flag Fc. Then, the automatic stop and restart of the engine 50 are allowed.

The engine controlling program represented by the flow chart of FIG. 4 is repeatedly executed at a predetermined time interval.

In S21, the vehicle running velocity v is detected and it is judged whether the vehicle is running or not, as in S2. When the vehicle is not being running, S22 and steps following S22 are not implemented.

When the vehicle is running, a positive judgment is obtained in S21, and S22 is implemented to judge whether the stop/restart inhibition flag Fc is being set or not. When the flag Fc is not being set, S23 is implemented to judge whether the engine 50 is being placed in its activated state. When the engine 50 is being placed in its activated state, S24 is implemented to judge whether the engine stop condition is satisfied or not. When the engine stop condition is satisfied, S25 is implemented to automatically stop the engine 50. When the engine stop condition is not satisfied, a negative judgment is obtained in S24 so that the engine 50 is not automatically stopped, namely, so that the engine 50 is held in its activated state.

On the other hand, when the engine 50 is in its stopped state, S26 is implemented to judge whether the engine restart condition is satisfied or not. When the engine restart condition is satisfied, S27 is implemented to automatically start the engine 50. When the engine restart condition is not satisfied, a negative judgment is obtained in S26 so that the engine 50 is held in its stopped state.

Thus, when the stop/restart inhibition flag Fc is being reset, the engine 50 is automatically stopped or restarted depending on whether the engine stop condition or engine restart condition is satisfied.

When the stop/restart inhibition flag Fc is being set, a positive judgment is obtained in S22. In this case, the engine 50 is held in the same operational state, namely, the operational state of the engine 50 is not changed, irrespective of whether the engine stop condition is satisfied or not, and irrespective of whether the engine restart condition is satisfied or not. That is, when the engine 50 is in its activated state, the activated state is maintained. When the engine 50 is in its stopped state, the stopped state is maintained.

In S28, it is judged whether the engine 50 is in its activated state or not. When the engine 50 is in its activated state, S29 is implemented to judge whether the engine stop condition is satisfied or not. As long as the stop/restart inhibition flag Fc is kept set, the engine 50 is held in its activated state not only when the engine stop condition is not satisfied but also when the engine stop condition is satisfied.

When the engine 50 is in its stopped state, a negative judgment is obtained in S28, and S30 is implemented to judge whether the engine restart condition is satisfied or not. As long as the stop/restart inhibition flag Fc is kept set, the engine 50 is not automatically restarted not only when the engine restart condition is not satisfied but also when the engine restart condition is satisfied.

Thus, in the present embodiment, when the absolute value $|d\theta|$ of the steering velocity de is not lower than the threshold value $d\theta th$ that is determined depending on the running velocity v, the stop/restart inhibition flag Fc is set whereby the automatic stop and restart of the engine 50 are inhibited. Consequently, it is possible to satisfactorily avoid the behavior of the vehicle from becoming unstable due to the automatic stop and/or restart of the engine 50.

Further, when the absolute value $|d\theta|$ of the steering velocity de is lower than the threshold value $d\theta th$, in principle, the stop/restart inhibition flag Fc is kept reset. While the inhibition flag Fc is kept reset, since the automatic stop of the engine 50 is allowed, the engine 50 is automatically stopped when the engine stop condition is satisfied, whereby the fuel efficiency can be improved.

Further, the stop/restart inhibition flag Fc is reset when the allowance waiting time elapses since the absolute value $|d\theta|$ of the steering velocity de has become lower than the threshold value $d\theta th$ after the stop/restart inhibition flag Fc had been set. Thus, since the inhibition flag Fc is not reset immediately after the absolute value $|d\theta|$ of the steering velocity de becomes lower than the threshold value $d\theta th$, it is possible to assure stability of the behavior of the vehicle.

On the other hand, in an arrangement in which the threshold value $d\theta th$ with respect to the absolute value $|d\theta|$ of the steering velocity $d\theta$ is a value that is held constant irrespective of whether the running velocity v is high or low, the fuel efficiency cannot be sufficiently improved, where the threshold value $d\theta th$ is set to a small value such that the behavior of the vehicle does not become unstable even when the vehicle running velocity v is high, because there would many opportunities to set the stop/restart inhibition flag Fc. Further, in this arrangement, where the threshold value $d\theta th$ is set to a large value such that the behavior of the vehicle does not become unstable only when the vehicle running velocity is low, it would be difficult to assure stability of the behavior although the fuel efficiency could be improved.

However, where the threshold value $d\theta th$ is set to a value that is smaller when the running velocity v is high than when the running velocity v is low, it is possible to set the stop/restart inhibition flag Fc precisely when the inhibition is really required, thereby making it possible to improve the fuel efficiency and assure stability of the behavior.

In the present embodiment, an allowing/inhibiting device is constituted principally by portions of the idle-stop control device 10 which are assigned to execute and store the economy-running allowing/inhibiting program represented by the flow chart of FIG. 3 and store the table of FIG. 2. Further, a running-velocity-basis threshold-value determiner is constituted principally by portions of the idle-stop control device 10 which are assigned to execute and store S3 of the flow chart of FIG. 3, while a time-elapse-based allowing/inhibiting portion is constituted principally by portions of the idle-stop control device 10 which are assigned to execute and store S4-S8 of the flow chart of FIG. 3.

Steps S28-S30 of the flow chart of FIG. 4 are not essential, because, as long as the stop/restart inhibition flag Fc is kept set, the same operational state of the engine 50 is maintained irrespective of whether the engine stop condition is satisfied or not and irrespective of whether the engine restart stop condition is satisfied or not, so that there is no need to judge whether the engine 50 is in its activated state or not, judge whether the engine stop condition is satisfied or not and judge whether the engine restart condition is satisfied or not.

Further, it can be regarded that, when the stop/restart inhibition flag Fc is being reset, a requirement included in each of the engine stop condition and engine restart condition is satisfied. For example, it can be regarded that the engine stop condition is satisfied in case of satisfactions of all three requirements that consist of (a) a requirement that there is no intention of the vehicle operator to accelerate the vehicle, (b) a requirement that a road surface on which the vehicle is running has a slope whose degree is not larger than a predetermined value, and (c) a requirement that the stop/restart inhibition flag Fc is being reset. Similarly, it can be regarded that the engine restart condition is satisfied in case of satisfaction of at least one of (x) a requirement that the booster negative pressure is closer to the atmospheric pressure than a predetermined pressure and (y) a requirement that there is intention of the vehicle operator to accelerate the vehicle, and also satisfaction of (z) a requirement that the stop/restart inhibition flag is being reset. That is, the engine restart condition is regarded to be satisfied when at least one of the requirements (x), (y) is satisfied and the requirement (z) is satisfied. In this case, it can be considered that an engine automatic stop/restart device is constituted principally by portions of the idle-stop control device 10 which are assigned to store and execute the economy-running allowing/inhibiting program and the engine controlling program that are represented by the respective flow charts of FIGS. 3 and 4.

Embodiment 2

Figure 5:
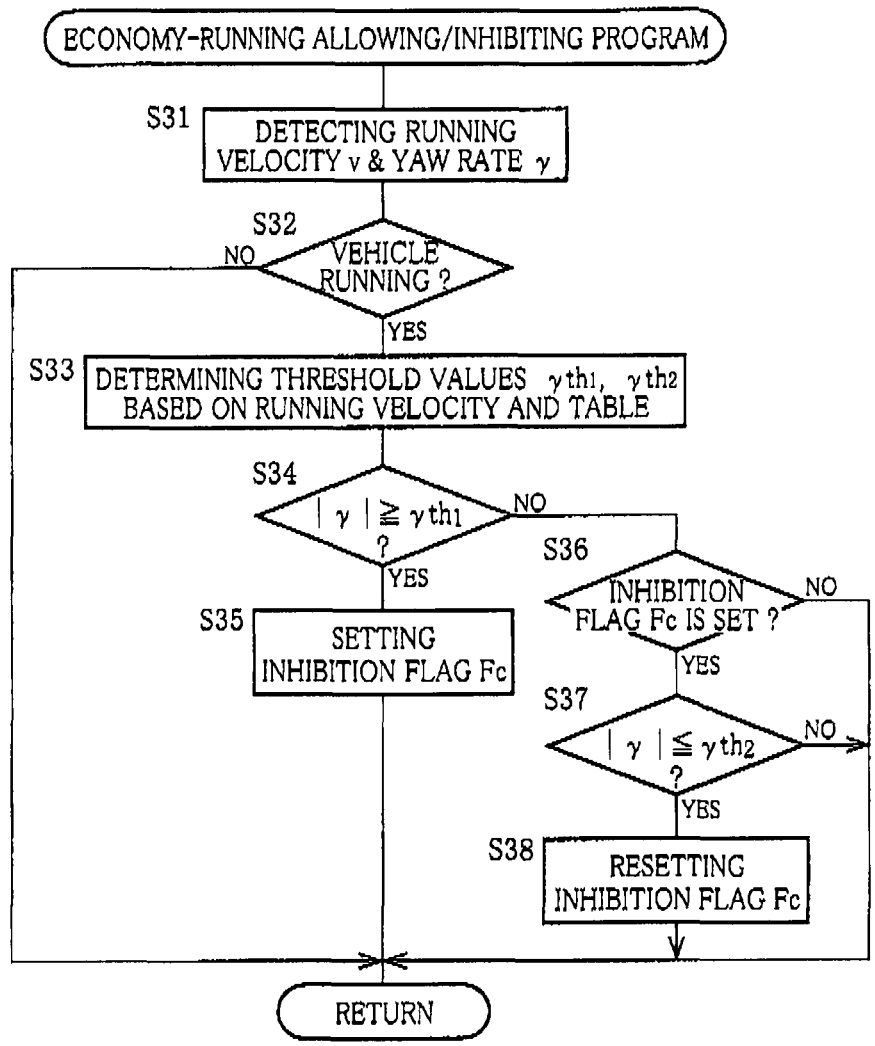
FIG. 5 is a flow chart of an econoray-running allowing/inhibiting program stored in a storage portion of the engine controlling apparatus according to an embodiment 2 of the invention.
Figure 6:
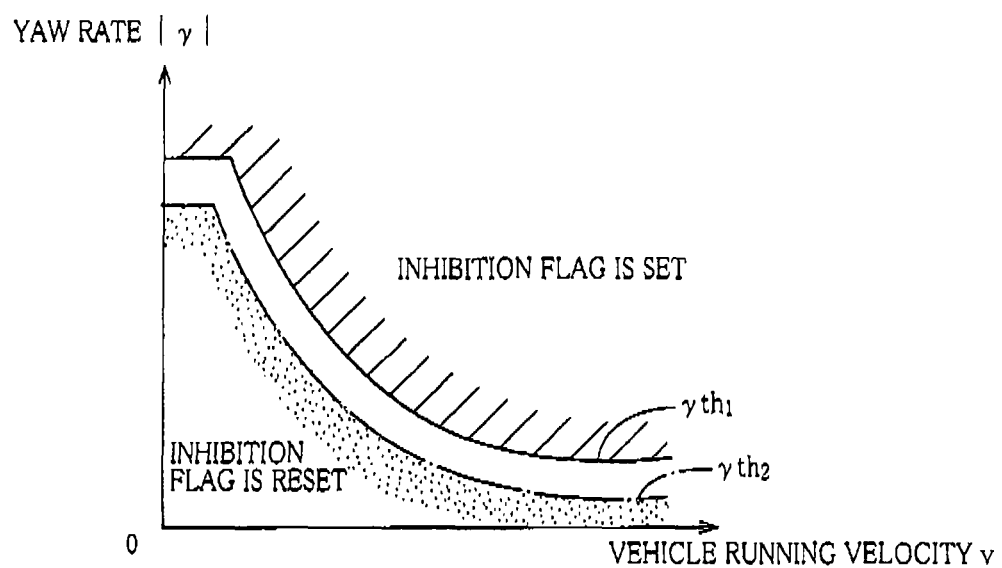
FIG. 6 is a map representing a threshold-value determining table stored in the storage portion of the engine controlling apparatus according to the embodiment 2.

In the engine controlling apparatus constructed according to the embodiment 2, the storage portion 14 of the idle-stop control device 10 stores therein, for example, a threshold-value determining table represented by a map of FIG. 6, an economy-running allowing/inhibiting program represented by a flow chart of FIG. 5 and the engine controlling program represented by the flow chart of FIG. 4.

In the embodiment 2, the stop/restart inhibition flag Fc is being set when an absolute value $|\gamma|$ of a yaw rate $\gamma$ as the turning-behavior-representing physical amount is not lower than a threshold value $\gamma th_1$ (inhibiting threshold value) that is determined depending on the vehicle running velocity v, and the stop/restart inhibition flag Fc is reset when the absolute value $|\gamma|$ of the yaw rate $\gamma$ becomes lower than an allowing threshold value $\gamma th_2$ which is lower than the inhibiting threshold value $\gamma th_1$ in any running velocity ranges.

Thus, since the threshold value $\gamma th_1$ upon setting of the stop/restart inhibition flag Fc and the threshold value $\gamma th_2$ upon resetting of the stop/restart inhibition flag Fc are different from each other, it is possible to avoid the stop/restart inhibition flag Fc from being set and reset repeatedly and frequently. Further, since the automatic stop and restart of the engine 50 are allowed when the absolute value $|\gamma|$ of the yaw rate $\gamma$ becomes lower than the allowing threshold value $\gamma th_2$ that is lower than the inhibiting threshold value $\gamma th_1$, it is possible to satisfactorily improve the stability of the behavior of the vehicle.

The inhibiting threshold value $\gamma th_1$ and the allowing threshold value $\gamma th_2$ may be referred to as "yaw-rate-based inhibiting threshold value" and "yaw-rate-based allowing threshold value", respectively.

The economy-running allowing/inhibiting program represented by the flow chart of FIG. 5 is repeatedly executed at a predetermined time interval. The engine controlling program is executed in substantially the same manner as in the embodiment 1.

In S31, the vehicle running velocity v and the yaw rate $\gamma$ are detected. In S32, it is judged whether the vehicle is running or not, i.e., the running velocity v is equal to or higher than the running judgment velocity voth. When the vehicle is running, S33 is implemented to determine the inhibiting threshold value $\gamma th_1$ and allowing threshold value $\gamma th_2$ based on the running velocity v and in accordance with the threshold-value determining table represented by the map of FIG. 6. Then, in S34, it is judged whether the absolute value $|\gamma|$ of the actual yaw rate $\gamma$ is equal to or higher than the inhibiting threshold value $\gamma th_1$. When the absolute value $|\gamma|$ of the actual yaw rate $\gamma$ is not lower than the inhibiting threshold value $\gamma th_1$, S35 is implemented to set the stop/restart inhibition flag Fc.

On the other hand, when the absolute value $|\gamma|$ of the actual yaw rate $\gamma$ is lower than the inhibiting threshold value $\gamma th_1$, S36 is implemented to judge whether the stop/restart inhibition flag Fc is being set or not. When the stop/restart inhibition flag Fc is not being set, the inhibition flag Fc is kept reset.

When the stop/restart inhibition flag Fc is being set, S37 is implemented to judge whether the absolute value $|\gamma|$ of the actual yaw rate $\gamma$ is equal to or lower than the allowing threshold value $\gamma th_2$. When the absolute value $|\gamma|$ of the yaw rate $\gamma$ is not lower than the allowing threshold value $\gamma th_2$, S38 is implemented to reset the stop/restart inhibition flag Fc.

When the stop/restart inhibition flag Fc is being set and the absolute value $|\gamma|$ of the yaw rate $\gamma$ is intermediate between the inhibiting threshold value $\gamma th_1$ and the allowing threshold value $\gamma th_2$, a negative judgment, a positive judgment and a negative judgment are obtained in S34, S36 and S37, respectively, whereby the stop/restart inhibition flag Fc is kept set.

Thus, in the embodiment 2, since the automatic stop and restart of the engine 50 are selectively allowed and inhibited based on the yaw rate $\gamma$, it is possible to improve the fuel efficiency while avoiding the behavior of the vehicle from becoming unstable.

Further, since the inhibiting threshold value $\gamma th_1$ and the allowing threshold value $\gamma th_2$ are provided by respective values different from each other, it is possible to avoid the stop/restart inhibition flag Fc from being set and reset repeatedly.

Further, since the automatic stop and restart of the engine 50 are allowed after the absolute value $|\gamma|$ of the yaw rate $\gamma$ has become smaller than the allowing threshold value $\gamma th_2$, it is possible to reliably avoid the behavior from becoming unstable.

In the present embodiment, an allowing/inhibiting device is constituted principally by portions of the idle-stop control device 10 which are assigned to execute and store the economy-running allowing/inhibiting program represented by the flow chart of FIG. 5. A running-velocity-basis threshold-value determiner is constituted by portions of the allowing/inhibiting device which are assigned to implement and store S33 of the economy-running allowing/inhibiting program. A hysteresis-based allowing/inhibiting portion is constituted by portions of the allowing/inhibiting device which are assigned to implement and store S34 through S38 of the economy-running allowing/inhibiting program.

An engine automatic stop/restart device is constituted principally by portions of the idle-stop control device 10 which are assigned to store the threshold-value determining table represented by the map of FIG. 6, and store and execute the economy-running allowing/inhibiting program and engine controlling program represented by the flow charts of FIGS. 5 and 4, respectively. In the present embodiment, it can be considered that the engine 50 is selectively stopped and restarted automatically based on the yaw rate $\gamma$.

Embodiment 3

Figure 7:
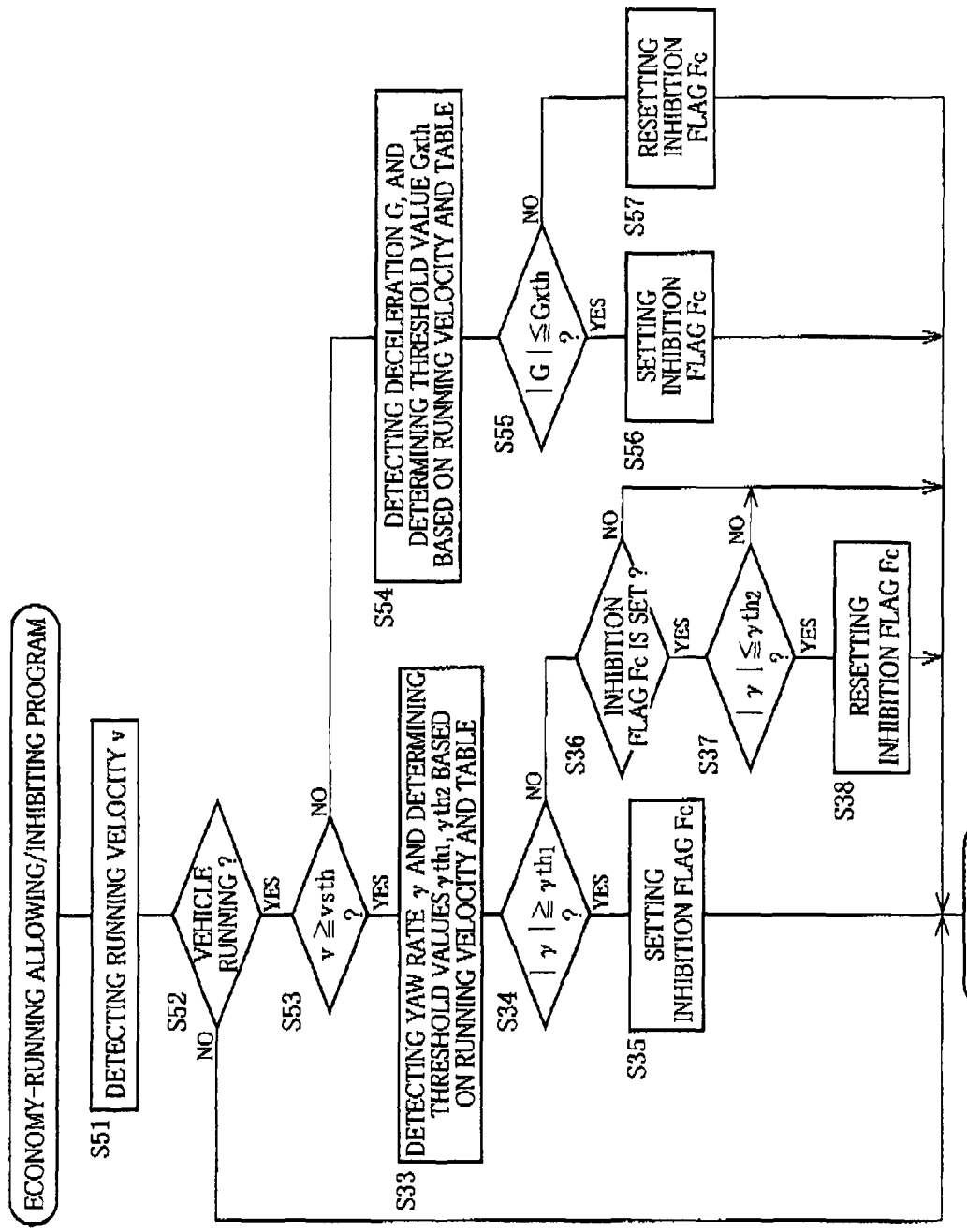
FIG. 7 is a flow chart of an economy-running allowing/inhibiting program stored in a storage portion of the engine controlling apparatus according to an embodiment 3 of the invention.
Figure 8:
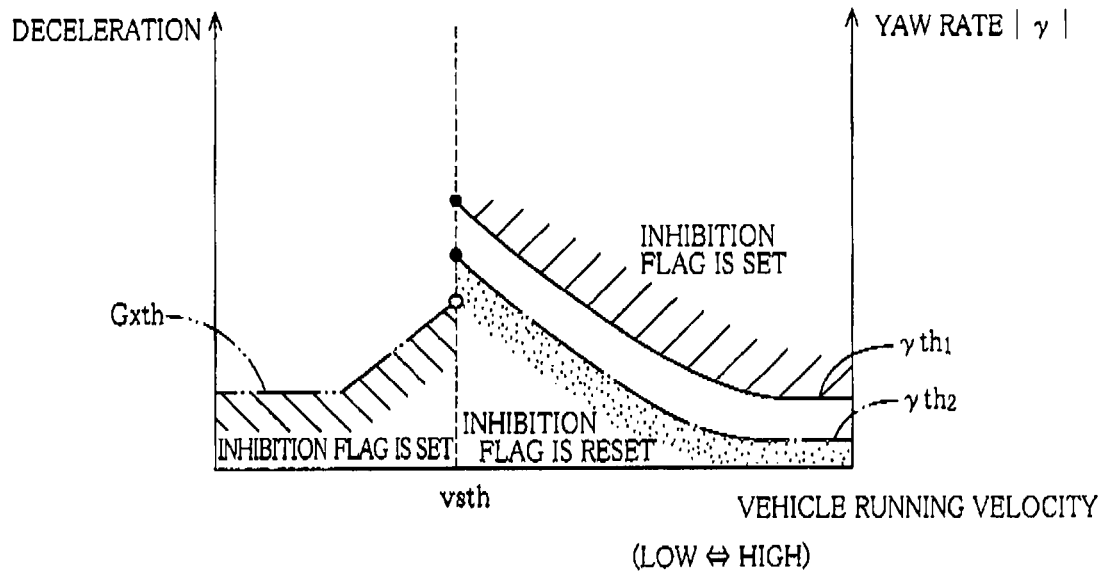
FIG. 8 is a map representing a threshold-value determining table stored in the storage portion of the engine controlling apparatus according to the embodiment 3.

In the engine controlling apparatus constructed according to the embodiment 3, the storage portion 14 of the idle-stop control device 10 stores therein, for example, a threshold-value determining table represented by a map of FIG. 8, an economy-running allowing/inhibiting program represented by a flow chart of FIG. 7 and the engine controlling program represented by the flow chart of FIG. 4.

In the present embodiment 3, the stop/restart inhibition flag Fc is selectively set and reset based on the yaw rate $\gamma$ during running of the vehicle at a high velocity (for example, on a highway road or a suburban road), and is selectively set and reset based on the deceleration G of the vehicle during running of the vehicle at a low velocity (for example, on a non-highway road or a downtown road). Further, it is judged that the vehicle is running at a high velocity when the actual running velocity v is not lower than a predetermined value (high-running-velocity judgment velocity) vsth that is within a range of 30-40 km/h. This high-running-velocity judgment velocity vsth is higher than the running judgment velocity voth that serves as a reference used for determining whether the vehicle is running or not.

During running of the vehicle at a high velocity, the vehicle behavior stability is likely to be problematic. During running of the vehicle at a low velocity, the vehicle behavior stability is unlikely to be problematic, and the vehicle tends to be accelerated and decelerated many times. Therefore, it is appropriate that the automatic stop and restart of the engine 50 are selectively allowed and inhibited based on the turning-behavior-representing physical amount during running of the vehicle at a high velocity, and that that the automatic stop and restart of the engine 50 are selectively allowed and inhibited based on the braking-behavior-representing physical amount during running of the vehicle at a low velocity.

Further, during running of the vehicle at a low velocity, the operator could be frustrated if the automatic stop and/or restart of the engine take place frequently. Further, during running of the vehicle at a low velocity, there is a case in which the vehicle operator has an intention to stop running of the vehicle, so that it is desirable that the engine 50 is automatically stopped in such a case. In view of this, during running of the vehicle at a low velocity, it is desirable that the engine 50 is automatically stopped or restarted in a manner that is not against the intention of the vehicle operator.

In the present embodiment, the stop/restart inhibition flag Fb is set in accordance with the table represented by the map of FIG. 8.

During running of the vehicle at a high velocity, as in the embodiment 2, each of the inhibiting threshold value $\gamma th_1$ and allowing threshold value $\gamma th_2$ is set to a value that is lower when the running velocity v is high than when the running velocity v is low.

During running of the vehicle at a low velocity, a threshold value Gxth, which is to be compared with a deceleration G of the vehicle, is set to a value that is lower when the running velocity v is low than when the running velocity v is high. (It is noted that the deceleration is a negative acceleration, and is represented by a positive value in description of the present embodiment, so that it is described that the deceleration G is high when an absolute value of the deceleration G is high, i.e., when the negative acceleration is low.) This is because it is estimated that the intention of the vehicle operator to stop running of the vehicle is stronger, even if the deceleration G is low, when the running velocity v is low than when the running velocity v is high. The threshold value Gxth may be referred to as "deceleration-based threshold value" or "low-velocity threshold value".

When the deceleration G is higher than the deceleration-based threshold value Gxth, it is assumed that the vehicle operator has an intention to stop running of the vehicle, so that the automatic stop and restart of the engine 50 are allowed. The allowance of the automatic stop of the engine 50 conforms to the operator's intention to stop running of the vehicle. Further, since the restart of the engine 50 is also allowed, the engine 50 can be automatically restarted when the booster negative pressure becomes closer to the atmospheric pressure than a predetermined pressure and when the operator's intention to stop the vehicle is switched to the intention to start the vehicle (i.e., when the acceleration opening degree becomes equal to larger than a predetermined value).

When the deceleration G is not higher than the deceleration-based threshold value Gxth, it is assumed that the vehicle operator does not have an intention to stop running of the vehicle, so that the automatic stop and restart of the engine 50 are inhibited. This is because, since the vehicle is running at a low velocity with a low deceleration, the activated state or stopped state of the engine 50 can be maintained without any inconvenience. Rather, in such a case, the vehicle operator could be frustrated if the engine 50 would be automatically stopped or restarted.

The economy-running allowing/inhibiting program represented by the flow chart of FIG. 7 is repeatedly executed at a predetermined time interval. The engine controlling program is executed substantially in the smear manner as in the embodiment 1.

S51 is implemented to detect the running velocity v. S52 is implemented to judge whether the detected running velocity v of the vehicle is equal to or higher than the running judgment velocity voth. S53 is implemented to judge whether the detected running velocity v is equal to or higher than the high-running-velocity judgment velocity vsth.

When the running velocity v is not smaller than the high-running-velocity judgment velocity vsth, S33 is implemented to determine the inhibiting threshold value $\gamma th_1$ and allowing threshold value $\gamma th_2$ based on the running velocity v and in accordance with the yaw-rate-based threshold-value determining table. Then, in S34 through S38, the stop/restart inhibition flag Fc is selectively set and reset based on the yaw rate $\gamma$ as in the embodiment 2.

On the other hand, when the vehicle is running at a running velocity v that is lower than the high-running-velocity judgment velocity vsth, S54 is implemented to obtain the deceleration G by differentiating the running velocity v, and to determine the deceleration-based threshold value Gxth based on the running velocity v and in accordance with the deceleration-based threshold-value determining table. Then, in S55, it is judged whether the actual deceleration G is equal to or lower than the deceleration-based threshold value Gxth. When the deceleration G is not higher than the deceleration-based threshold value Gxth, the stop/restart inhibition flag Fc is set. When the deceleration G is higher than the deceleration-based threshold value Gxth, the stop/restart inhibition flag Fc is reset.

Thus, during running of the vehicle at a low velocity, the automatic stop and restart of the engine 50 are allowed only when the vehicle operator has an intention to stop running of the vehicle, so that it is possible to avoid the engine 50 from being automatically stopped or restarted against the intention of the vehicle operator.

In the present embodiment, a physical amount changer is constituted by portions of the idle-stop control device 10 which are assigned to store and implement S33, S53 and S54 of the flow chart of FIG. 7. Further, a running-velocity-based allowing/inhibiting portion is constituted by portions of the idle-stop control device 10 which are assigned to store and implement the economy-running allowing/inhibiting program represented by the flow chart of FIG. 7.

Embodiment 4

Figure 9:
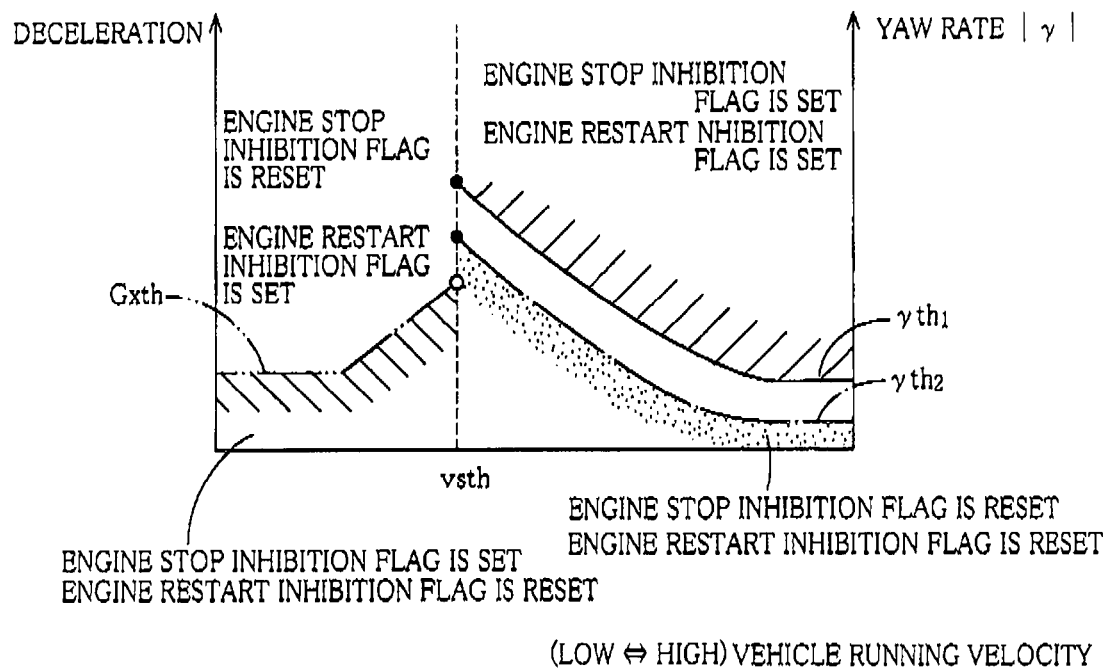
FIG. 9 is a map representing a threshold-value determining table stored in a storage portion of the engine controlling apparatus according to an embodiment 4 of the invention.
Figure 10:
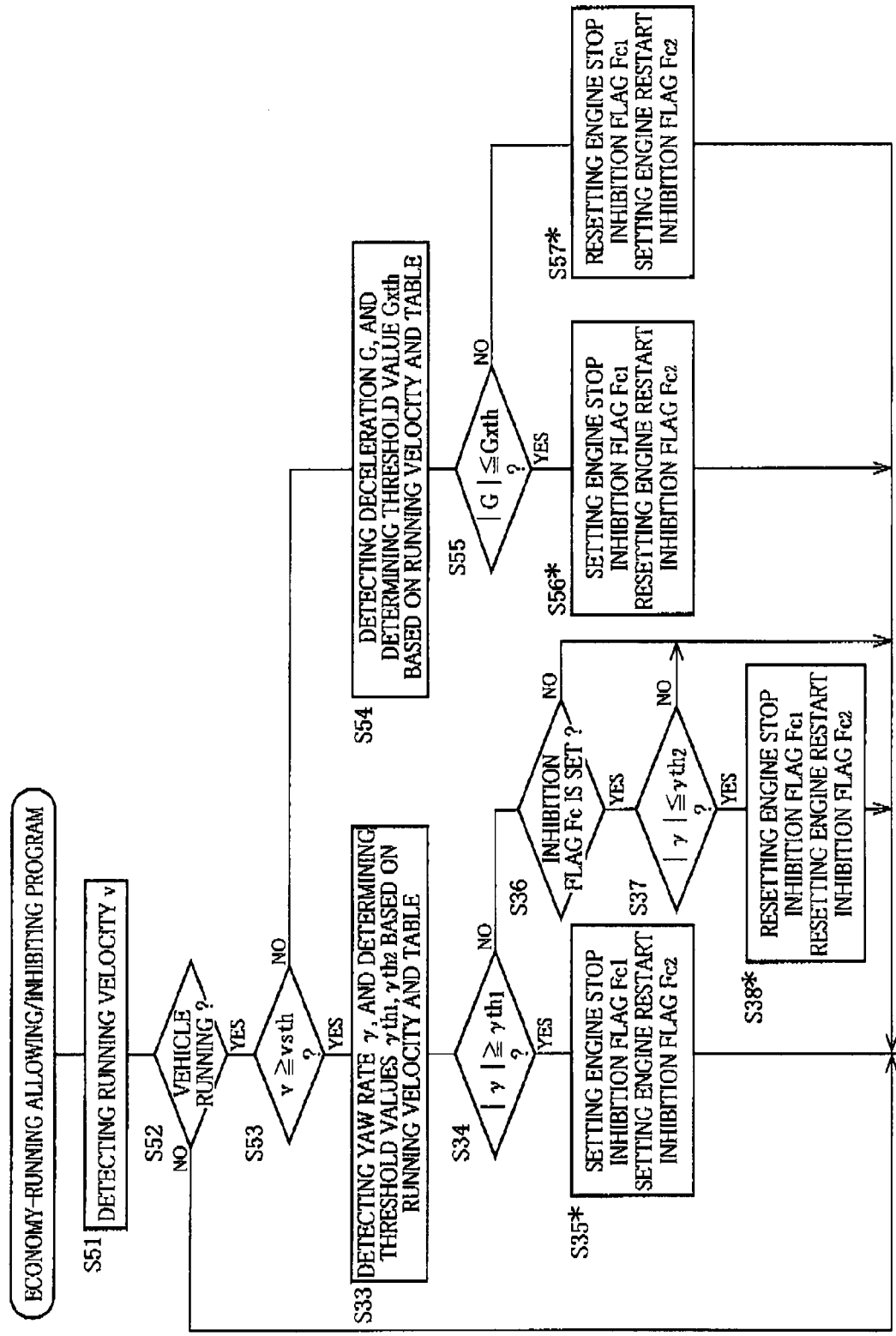
FIG. 10 is a flow chart of an economy-running allowing/inhibiting program stored in the storage portion of the engine controlling apparatus according to the embodiment 4.
Figure 11:
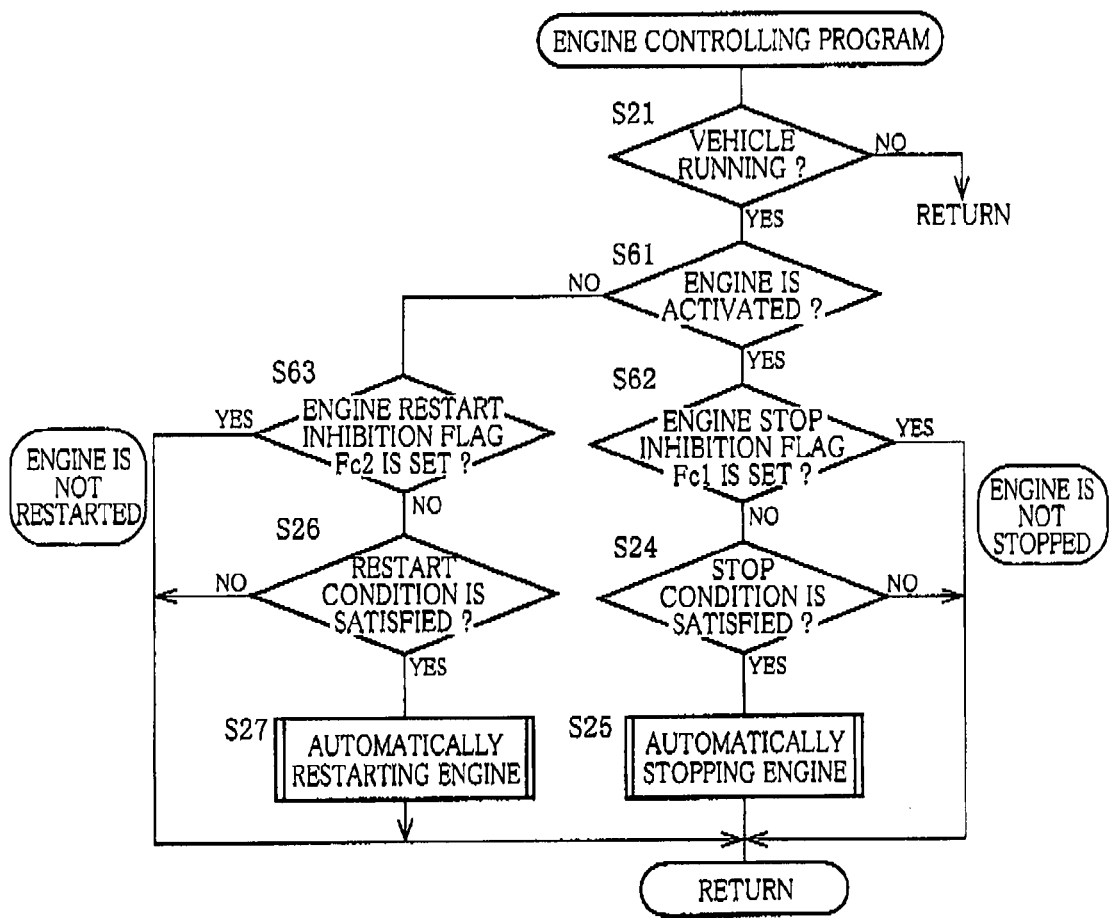
FIG. 11 is a flow chart of an engine controlling program stored in the storage portion of the engine controlling apparatus according to the embodiment 4.

In the engine controlling apparatus constructed according to the embodiment 4, the storage portion 14 of the idle-stop control device 10 stores therein, for example, a threshold-value determining table represented by a map of FIG. 9, an economy-running allowing/inhibiting program represented by a flow chart of FIG. 10 and an engine controlling program represented by the flow chart of FIG. 11.

In the above embodiment 8, when the deceleration G of the vehicle is higher than the deceleration-based threshold value Gxth during running of the vehicle at a low velocity, the automatic stop and restart of the engine 50 are both allowed. However, in this embodiment 4, the automatic stop of the engine 50 is allowed while the automatic restart of the engine 50 is inhibited. This arrangement makes it possible to reliably avoid the engine 50 (placed in its stopped state) from being restarted against an intention of the vehicle operator when the operator's intention is to stop running of the vehicle.

Further, in the above embodiment 3, when the deceleration G of the vehicle is not higher than the deceleration-based threshold value Gxth, the automatic stop and restart of the engine 50 are both inhibited. However, in this embodiment 4, the automatic stop of the engine 50 is inhibited while the automatic restart of the engine 50 is allowed. This arrangement makes it possible to restart the engine 50 (placed in its stopped state) when the booster negative pressure is closer to the atmospheric pressure than the predetermined pressure, i.e., when there is an intention of the vehicle operator to accelerate the vehicle.

As shown in the map of FIG. 9, during running of the vehicle at a velocity v that is not lower than the high-running-velocity judgment velocity vsth, the stop/restart inhibition flags are set when the absolute value $|\gamma|$ of the yaw rate $\gamma$ is not lower than the inhibiting threshold value $\gamma th_1$, as in the embodiment 3 (see FIG. 8). That is, the engine stop inhibition flag Fc1 and engine restart inhibition flag Fc2 are both set. The stop/restart inhibition flags are reset when the absolute value $|\gamma|$ of the yaw rate $\gamma$ is lower than the inhibiting threshold value $\gamma th_1$. That is, the engine stop inhibition flag Fc1 and engine restart inhibition flag Fc2 are both reset.

On the other hand, during running of the vehicle at a velocity v that is not higher than the high-running-velocity judgment velocity vsth, when the deceleration G is higher than the deceleration-based threshold value Gxth, the engine stop inhibition flag Fc1 and the engine restart inhibition flag Fc2 are reset and set, respectively. When the deceleration G is not higher than the deceleration-based threshold value Gxth, the engine stop inhibition flag Fc1 and the engine restart inhibition flag Fc2 are set and reset, respectively.

The economy-running allowing/inhibiting program represented by the flow of FIG. 10 is repeatedly executed at a predetermined time interval. This economy-running allowing/inhibiting program is substantially the same as the economy-running allowing/inhibiting program represented by the flow chart of FIG. 7 in the embodiment 3, the same step number will be used to identify steps that are to be implemented for carrying out the same procedure, and descriptions of these steps will be omitted.

During running of the vehicle at a running velocity v that is not lower than the high-running-velocity judgment velocity vsth, when the absolute value |γ| of the actual yaw rate γ is not lower than the inhibiting threshold value $\gamma th_1$ that is determined depending on the running velocity v, S35* is implemented to set both the engine stop inhibition flag Fc1 and engine restart inhibition flag Fc2. Further, when the absolute value |γ| of the actual yaw rate γ is not higher than the allowing threshold value $\gamma th_2$, S38* is implemented to reset both the engine stop inhibition flag Fc1 and engine restart inhibition flag Fc2.

During running of the vehicle at a running velocity v that is lower than the high-running-velocity judgment velocity vsth, when the absolute value |G| of the actual deceleration G is not higher than the deceleration-based threshold value Gxth that is determined depending on the running velocity v, S56* is implemented to set the engine stop inhibition flag Fc1 and reset the engine restart inhibition flag Fc2. Further, when the absolute value |G| of the actual deceleration G is higher than the deceleration-based threshold value Gxth, S57* is implemented to reset the engine stop inhibition flag Fc1 and set the engine restart inhibition flag Fc2.

The engine controlling program represented by the flow of FIG. 11 is repeatedly executed at a predetermined time interval.

In S21, it is judged whether the vehicle is running or not, i.e., whether the running velocity v is equal to higher than the running judgment velocity voth. When the vehicle is running, S61 is implemented to judge whether the engine 50 is in its activated state. When the engine 50 is in its activated state, S62 is implemented to judge whether the engine stop inhibition flag Fc1 is being set or not. When the engine stop inhibition flag Fc1 is being set, namely, when the engine 50 is not automatically stopped, the engine 50 is held in its activated state, without judging whether the engine stop condition is satisfied or not (i.e., irrespective of whether the engine stop condition is satisfied or not). When the engine stop inhibition flag Fc1 is being reset, S24 is implemented to judge whether the engine stop condition is satisfied or not, and S25 is implemented to automatically stop the engine 50 upon satisfaction of the engine stop condition, as in the embodiment 1.

On the other hand, when the engine 50 is in its stopped state, a negative decision is obtained in S61. Then, S63 is implemented to judge whether the engine restart inhibition flag Fc2 is being set or not. When the engine restart inhibition flag Fc2 is being set, the stopped state of the engine 50 is maintained. That is, the stopped state of the engine 50 is maintained without judging whether the engine restart condition is satisfied or not (i.e., irrespective of whether the engine restart condition is satisfied or not). When the engine restart inhibition flag Fc2 is being reset, S26 is implemented to judge whether the engine restart condition is satisfied or not. When the engine restart condition is satisfied, S27 is implemented to automatically start the engine 50.

Thus, in the embodiment 4, during running of the vehicle at a running velocity v that is lower than the high-running-velocity judgment velocity vsth, when the deceleration G is higher than the deceleration-based threshold value Gxth, the engine restart inhibition flag Fc2 is set so that the engine 50 placed in its stopped state is not restarted. It is therefore possible to avoid the engine 50 from being restarted against the intention of the vehicle operator to stop the vehicle.

Further, when the deceleration G of the vehicle is not higher than the deceleration-based threshold value Gxth, the engine restart inhibition flag Fc2 is reset, so that the engine 50 can be restarted when the intention of the vehicle operator is to accelerate the vehicle, thereby making it possible to control the engine 50 in conformity with the operator's intention.

It is noted that it is possible to use, in place of the deceleration, an operating force applied to a brake operating member (not shown), an amount of operation of the brake operating member, a pressing force applied from a friction member to a brake rotary body, or a braking torque acting on a wheel of the vehicle, for example.

Embodiment 5

In each of the above embodiments 1-4, the threshold-value determining table is provided by a predetermined fixed table. However, in this embodiment 5, the threshold-value determining table is provided by a variable table.

Figure 12:
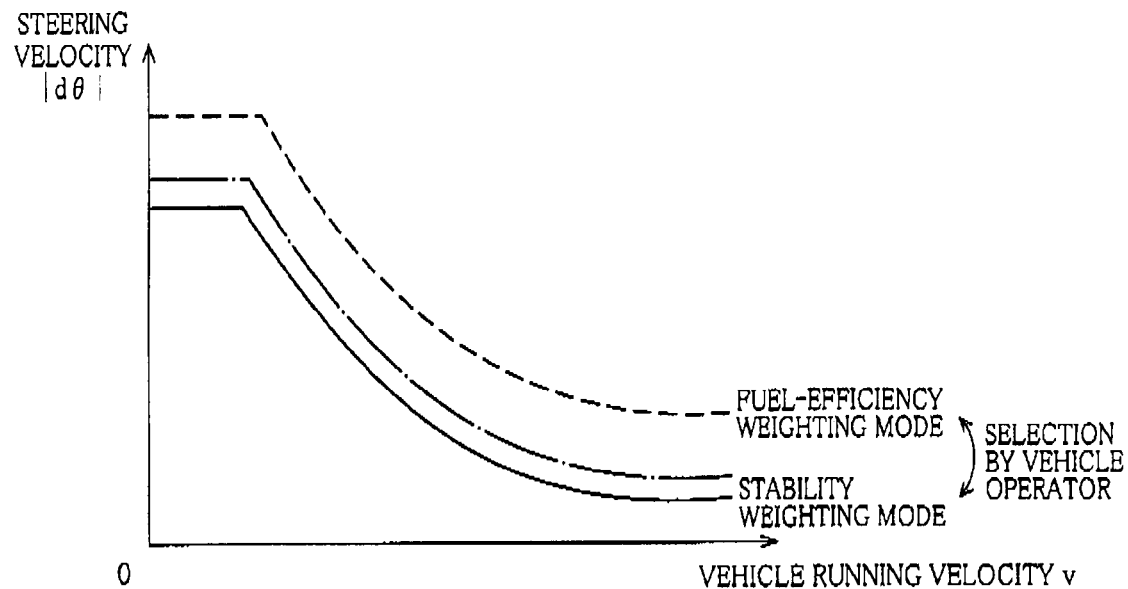
FIG. 12 is a set of maps representing threshold-value determining tables stored in a storage portion of the engine controlling apparatus according to an embodiment 5 of the invention.
Figure 13:
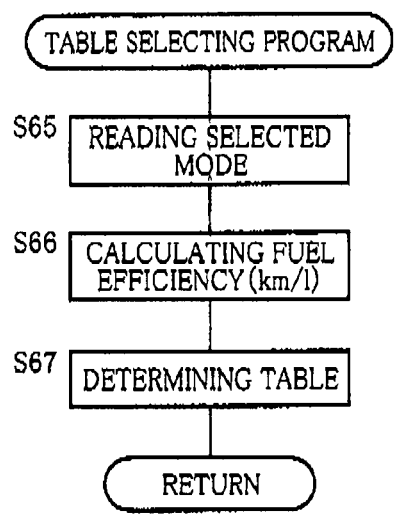
FIG. 13 is a flow chart of a table selecting program stored in the storage portion of the engine controlling apparatus according to the embodiment 5.

In the engine controlling apparatus constructed according to this embodiment 5, the storage portion 14 of the idle-stop control device 10 stores therein, for example, a plurality of threshold-value determining tables represented by maps of FIG. 12, the economy-running allowing/inhibiting program represented by the flow chart of FIG. 3, the engine controlling program represented by the flow chart of FIG. 4 and a table selecting program represented by a flow chart of FIG. 13.

In accordance with an intention of the vehicle operator, one of the plurality of threshold-value determining tables can be selected.

When the fuel-efficiency weighting mode is selected by operation of the economy-running-mode selector switch 54 by the vehicle operator, the threshold-value determining table represented by broken line in FIG. 12 can be selected (it may be considered also that the threshold value can be determined). When the stability weighting mode is selected, the threshold-value determining table represented by solid line in FIG. 12 can be selected.

The threshold value represented by the broken line may be a value such that, when the absolute value |dθ| of the steering velocity dθ becomes higher than this value, the behavior of the vehicle becomes unstable (i.e., a spinning tendency or drifting out tendency of the vehicle is increased) due to the automatic stop and/or restart of the engine 50. With the threshold value being thus determined, it is possible to reduce opportunities that the stop/restart inhibition flag Fc is set, and to increase opportunities that the engine 50 is stopped, whereby the fuel efficiency can be improved.

On the other hand, when the table represented by the solid line is selected, the stop/restart inhibition flag is set at increased opportunities. Since the engine 50 is stopped at reduced opportunities, the behavior of the vehicle can be improved by the reduction of opportunities.

Further, the threshold-value determining table may be selected depending on the fuel efficiency.

For example, the selection of the threshold-value determining table may be made based on comparison between the actual fuel efficiency and a standard fuel efficiency (or a maximum fuel efficiency) that is determined depending on type of the vehicle. When the actual fuel efficiency is lower than the standard fuel efficiency by a predetermined value or more (i.e., when the actual running distance per unit fuel consumption is shorter than a standard running distance per unit fuel consumption by a predetermined value of more), the table represented by the broken line can be selected as the threshold-value determining table. When a difference between the actual fuel efficiency and the standard fuel efficiency is smaller than a predetermined value, the table represented by the solid line can be selected as the threshold-value determining table.

Further, the threshold-value determining table may be a table which is closer to the table represented by the broken line when a value obtained by subtracting the actual fuel efficiency from the standard fuel efficiency dependent on type of the vehicle is large (i.e., when the actual fuel efficiency is considerably lower than the standard fuel efficiency) than when the obtained value is small. That is, a table that is intermediate between the tables represented by the respective broken and solid lines is employed as the threshold-value determining table. Thus, the threshold-value determining table is determined through learning that is made based on the actual fuel efficiency, whereby the fuel efficiency can be generally improved.

Further, the threshold-value determining table may be determined based on both the actual fuel efficiency and an intention of the vehicle operator (i.e., demand of the vehicle operator to improve the fuel efficiency).

For example, during the running-stability weighting mode that is selected by the vehicle operator, when the actual fuel efficiency is lower than the standard fuel efficiency by the predetermined value or more, the determined threshold-value determining table may be provided by a table which is closer to the table represented by the broke line than to the table represented by the solid line. Further, during the fuel-efficiency weighting mode selected by the operator, when the difference between the actual fuel efficiency and the standard fuel efficiency is smaller than the predetermined value, the determined threshold-value determining table may be provided by a table which is closer to the table represented by the solid line than to the table represented by the broken line. Further, a relative weighting may be given to each of the mode selection by the vehicle operator and the difference between the actual fuel efficiency and the standard fuel efficiency, so that the threshold-value determining table can be determined based on the relative weighting. The relative weighting given to each of the mode selection and the efficiency difference may be a predetermined factor, a factor selectable by operation of the vehicle operator, or a factor updated based on, for example, the actual fuel efficiency and the number of times at which the stop/restart inhibition flag has been set.

The table selecting program represented by the flow chart of FIG. 13 is repeatedly executed at a predetermined time interval. The economy-running allowing/inhibiting program and engine controlling program are executed substantially in the same manners as in the embodiment 1.

S65 is implemented to read the mode selected by operation of the economy-running-mode selector switch 54. S66 is implemented to obtain the actual fuel efficiency through the fuel-efficiency obtaining device 40. Then, in S67, the threshold-value determining table is determined based on the selected mode and the actual fuel efficiency.

It is noted that implementation of step S66 is not required where the actual fuel efficiency is not taken into consideration upon determination of the threshold-value determining table, and that implementation of step S65 is not required where the intention of the vehicle operator is not taken into consideration upon the determination.

Thus, in the embodiment 5, the threshold-value determining table is determined based on at least one of the actual fuel efficiency and the demand of the vehicle operator with respect to the fuel efficiency, thereby making it possible to improve the fuel efficiency with the operator's intention being reflected in the control of the engine of the vehicle.

In the embodiment 5, a fuel-efficiency-basis threshold-value determiner is constituted principally by portions of the idle-stop control device 10 which are assigned to store and execute the table selecting program of FIG. 13. Selecting the threshold-value determining table corresponds to determining the threshold value. This is because the threshold-value determining table is represented by a relationship between the threshold value and the vehicle running velocity so that selecting the threshold-value determining table corresponds to determining the threshold value in relation with the running velocity.

It is noted that the threshold value may be determined in a manner that reduces the number of times at which the stop/restart inhibition flag Fc is set.

For example, in case of use of the table represented by one-dot chain line, when the number of times by which the inhibition flag has been set during a predetermined length of time is not smaller than a predetermined number of times, the used table may be shifted toward the table represented by the broken line, preferably, without the used table being shifted over the table presented by the broken line. Thus, the threshold value can be determined through learning that is made based on the number of times by which the inhibition flag has been set, whereby the fuel efficiency can be improved.

Embodiment 6

In each of the above embodiments 1-5, the stop/restart inhibition flag Fc is selectively set and reset depending on the absolute value |dθ| of the steering velocity 6 or the absolute value |γ| of the yaw rate γ. However, the inhibition flag Fc may be selectively set and reset depending on also a slip angle β of the vehicle body.

In the engine controlling apparatus constructed according to this embodiment 6, the storage portion 14 of the idle-stop control device 10 stores therein, for example, the threshold-value determining table represented by the map of FIG. 14(a), the economy-running allowing/inhibiting program represented by the flow chart of FIG. 3 and the engine controlling program represented by the flow chart of FIG. 4.

Figure 15:
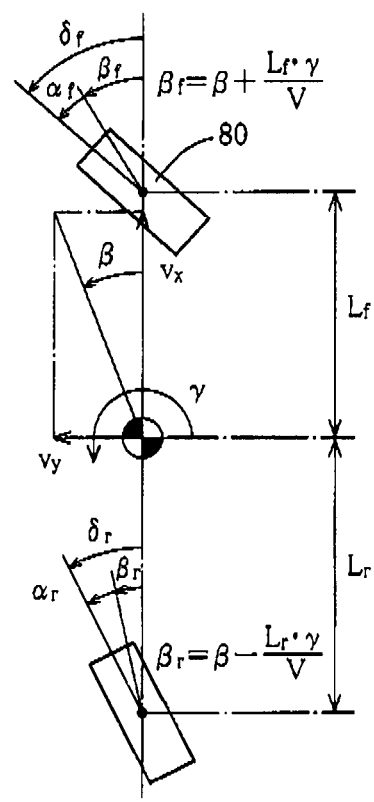
FIG. 15 is a view showing a two-degree-of-freedom model that is used for obtaining a body slip angle and a front-wheel lateral slip angle of a vehicle that is equipped with the engine controlling apparatus.

The absolute value of the vehicle-body slip angle β as the turning-behavior-representing physical amount can be obtained based on a two-degree-of-freedom model as shown in FIG. 15, specifically, in accordance with the following expression using a longitudinal velocity vx and a lateral velocity yy of the vehicle:

$$\beta = vy/vx$$

This is because the slip angle β can be approximated by tan β when the angle b is small. The longitudinal velocity vx may be obtained based on a running velocity v detected by the wheel velocity sensor 20. The lateral velocity vy may be obtained by integrating a value αy detected by the lateral acceleration sensor 32.

The behavior of the vehicle is more likely to become unstable due to the automatic stop and/or restart of the engine 50 when the absolute value |β| of the vehicle-body slip angle β is large, than when the absolute value |β| is small. Further, even without change of the absolute value |β| of the vehicle-body slip angle β, the behavior is more likely to be become unstable when the running velocity v (=vx) is high than when the velocity v is low. Therefore, it is appropriate that the threshold value (vehicle-body-slip-angle-based threshold value) βth is determined in accordance with the table represented by the map of FIG. 14 (a).

Regarding the economy-running allowing/inhibiting program and engine controlling program, these programs are executed substantially in the same manners as in the above embodiments.

It is noted that the vehicle-body slip angle β may be obtained by integrating a value obtained from the following expression that is established with respect to the slip angle β:

$$d\beta/dt=(\alpha y/vx)-\gamma$$

Further, as the turning-behavior-representing physical amount, it is possible to employ, in place of the absolute value |β| of the slip angle β, an absolute value |αf| of a lateral slip angle αf of a front wheel 80 of the vehicle, an absolute value of |Δγ| of a yaw rate deviation Δγ or an absolute value |θ| of a steering angle θ, for example.

As shown in FIG. 15, the front-wheel lateral slip angle αf is obtained by subtracting a vehicle-body slip angle βf (as measured at axle of the front wheel 80) from an inclination angle δf of the front wheel 80. Therefore, the front-wheel lateral slip angle αf can be obtained in accordance with the following expression:

$$\alpha f=\delta f-\beta f$$

The vehicle-body slip angle βf (as measured at axle of the front wheel 80) can be obtained in accordance with the following expression:

$$\beta f=\beta+\gamma\times Lf/V$$

In the above expressions, "γ" represents the yaw rate, "Lf" represents a distance between a center of gravity of the vehicle and the axle of the front wheel, and the front-wheel inclination angle δf is obtained by multiplying the steering angle θ with a factor.

The behavior of the vehicle is more likely to become unstable as a result of the automatic stop and/or restart of the engine 50 when the absolute value |αf| of the thus obtained front-wheel lateral slip angle αf is large than when the absolute value |αf| is small. Further, even without change of the absolute value |αf| of the front-wheel lateral slip angle αf, the behavior of the vehicle is more likely to be unstable when the running velocity v of the vehicle is high than when the running velocity v is low. Therefore, it is appropriate that the threshold value (i.e., front-wheel-lateral-slip-angle-based threshold value) is determined in accordance with a table similar to the table of FIG. 14 (a).

Further, the absolute value of |Δγ| of the yaw rate deviation Δγ can be employed as the turning-behavior-representing physical amount.

The absolute value of |Δγ| of the yaw rate deviation Δγ is an absolute value of an amount that is obtained by subtracting an actual yaw rate γ from a target yaw rate γ*. The target yaw rate γ* can be obtained based on, for example, the steering angle θ and the running velocity v.

The vehicle operator is likely to perform an abrupt operation with a higher probability when the absolute value of |Δγ| of the yaw rate deviation Δγ (which is the amount obtained by subtracting the actual yaw rate γ from the target yaw rate γ*) is large then when the absolute value of |Δγ| is small. In view of this, it can be considered that the absolute value of |Δγ| of the yaw rate deviation Δγ corresponds to the steering velocity dθ.

Figure 14:
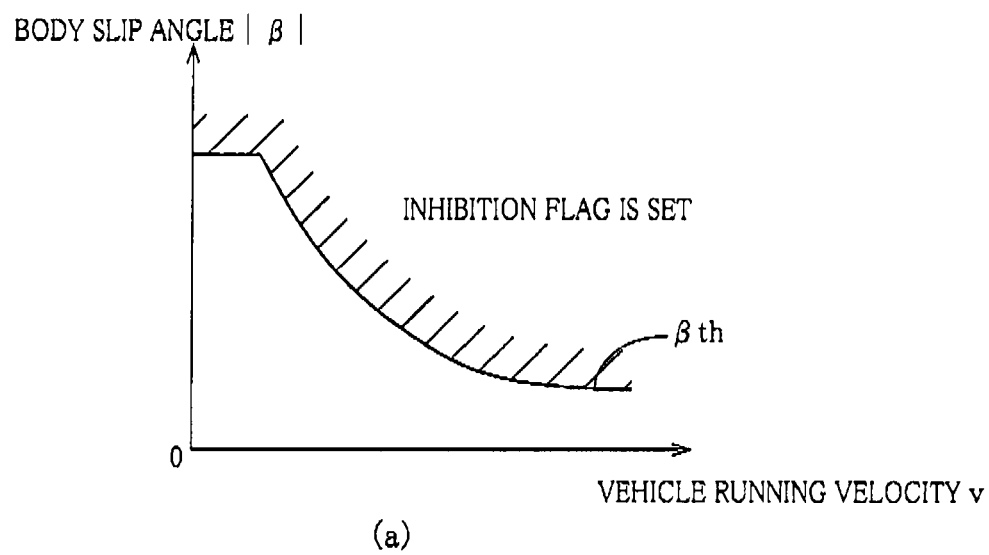
FIG. 14 is a set of maps representing threshold-value determining tables stored in a storage portion of the engine controlling apparatus according to an embodiment 6 of the invention.
Figure 14:
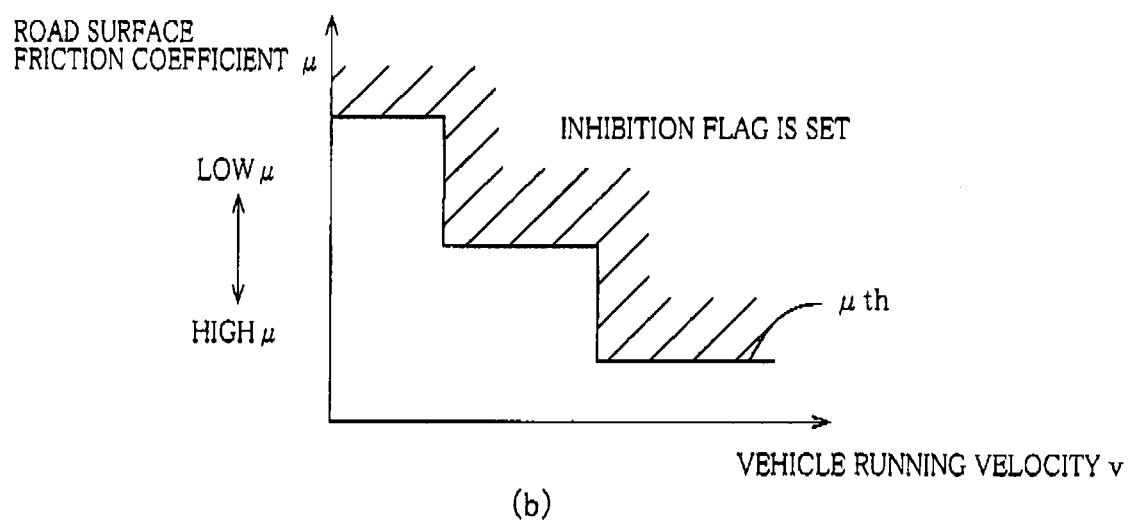

Therefore, the threshold value (i.e., deviation-based threshold value) based on the absolute value of |Δγ| of the yaw rate deviation Δγ can be set to a value that is smaller when the running velocity v is high than when the running velocity v is low, as in the table of FIG. 14 (a).

It is noted that the absolute value |θ| of the steering angle θ of the steering member (not shown) can be also employed as the turning-behavior-representing physical amount.

Further, the friction coefficient μ of the road surface can be employed as the turning-behavior-influencing physical amount. The behavior of the vehicle is more stable when the friction coefficient μ of the road surface is high than when the friction coefficient is low. With the friction coefficient μ being not changed, the behavior is more stable when the running velocity v of the vehicle is low than when the running velocity v is high. Therefore, the threshold value μth (i.e., road-surface-friction-coefficient-based threshold value) based on the friction coefficient μ of the road surface can be set to a value that is larger when the running velocity v is high than when the running velocity v is low, as shown in FIG. 14 (b). Further, the road-surface-friction-coefficient-based threshold value μth may be changed in a stepwise manner with change of the running velocity v, as shown in FIG. 14 (b), such that the threshold value μth is changed between two levels or more than two levels.

It is noted that the threshold value based on the steering angle θ, steering velocity dθ, yaw rate deviation Δγ, vehicle-body slip angle β, or front-wheel lateral slip angle αf may be changed also in a stepwise manner with change of the running velocity v, as in the table of FIG. 14 (b).

Embodiment 7

In each of the above embodiments 1-6, the stop/restart inhibition flag Fc is selectively set and reset depending on a single physical amount. However, the inhibition flag Fc may be selectively set and reset depending on two or more physical amounts, too.

Figure 16:
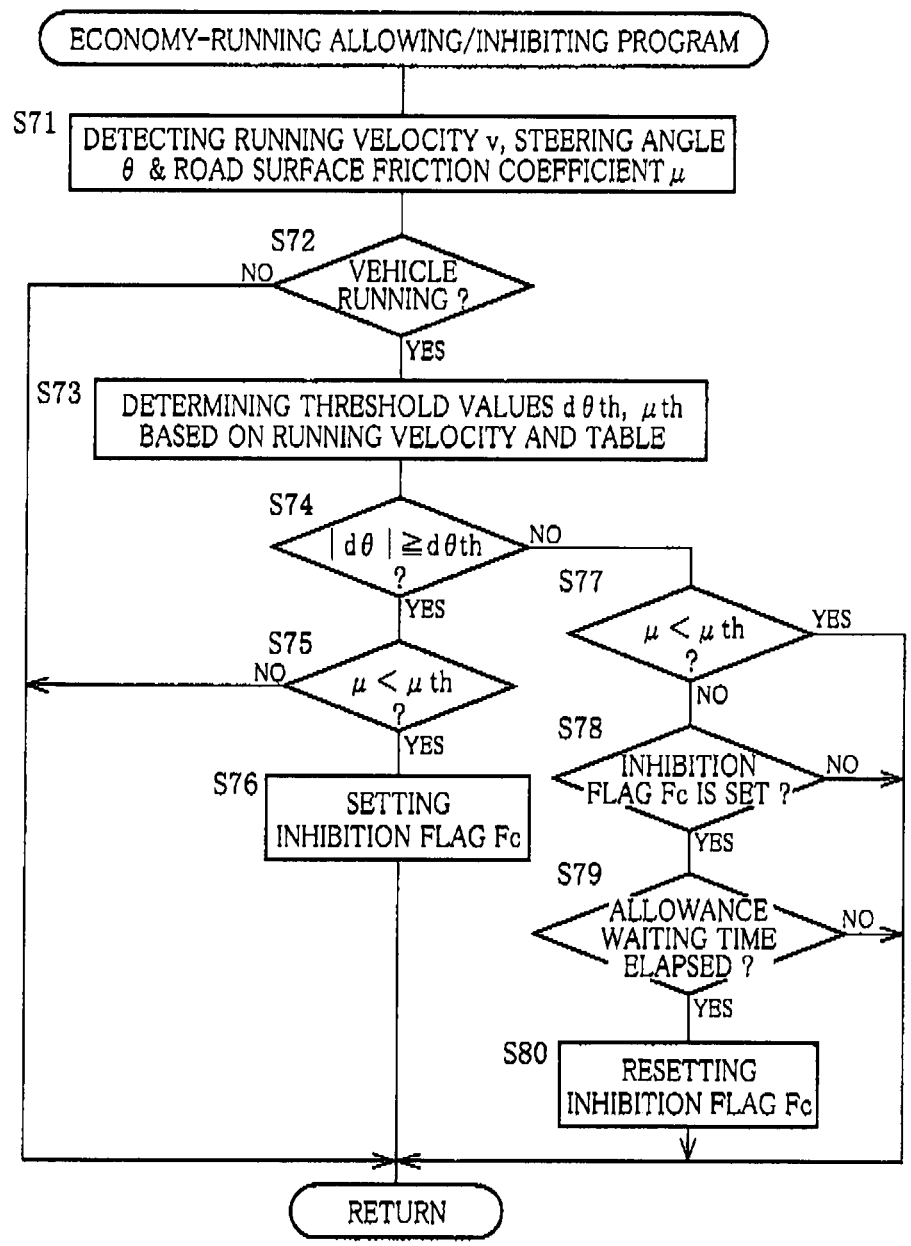
FIG. 16 is a flow chart of an economy-running allowing/inhibiting program stored in a storage portion of the engine controlling apparatus according to an embodiment 7 of the invention.
Figure 17:
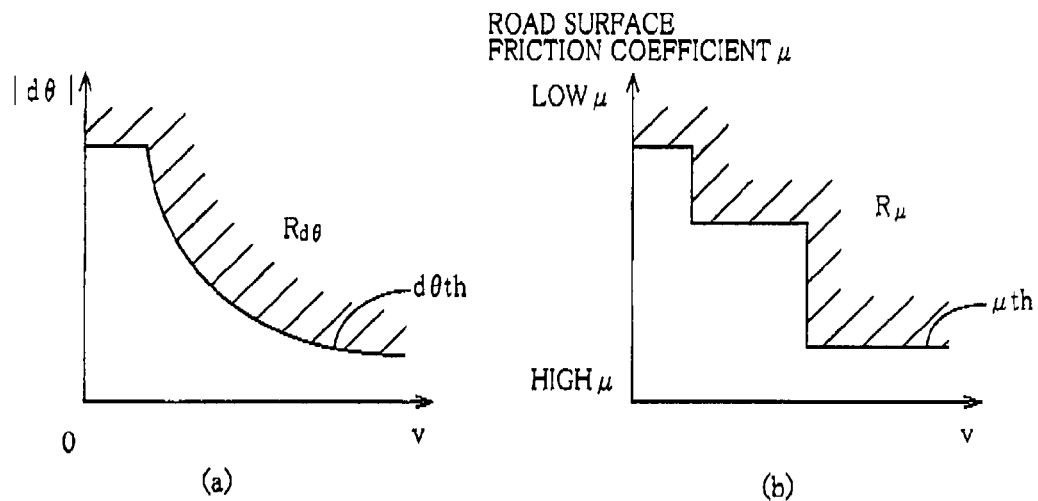
FIG. 17 is a set of maps representing threshold-value determining tables stored in the storage portion of the engine controlling apparatus according to the embodiment 7.

In the engine controlling apparatus constructed according to this embodiment 7, the storage portion 14 of the idle-stop control device 10 stores therein, for example, two threshold-value determining tables represented by respective maps of FIG. 17 (a), (b), an economy-running allowing/inhibiting program represented by the flow chart of FIG. 16 and the engine controlling program represented by the flow chart of FIG. 4.

In this embodiment 7, the stop/restart inhibition flag Fc is selectively set and reset depending on the turning-behavior-representing physical amount in the form of the absolute velocity |dθ| of the steering velocity de and the turning-behavior-influencing physical amount in the form of the friction coefficient μ of the road surface. The stop/restart inhibition flag Fc is set when the steering velocity dθ and running velocity v both lie in a region Rdθ and the road-surface friction coefficient μ and running velocity v both lie in a region Rμ, as shown in FIG. 17 (a), (b).

For example, even when the steering velocity de being higher than the threshold value dθth, the stop/restart inhibition flag Fc is not set as long as the road-surface friction coefficient μ is higher than the threshold value μth, since the behavior of the vehicle does not necessarily become unstable due to the automatic stop and/or restart of the engine 50 in such a case. On the other hand, when the steering velocity dθ being higher than the threshold value dθth with the road-surface friction coefficient being lower than the threshold value μth, the stop/restart inhibition flag Fc is set since the behavior is likely to become unstable with a high probability in such a case.

In this arrangement in which the judgment as to whether the behavior becomes unstable is made based on both of the steering velocity de and road-surface friction coefficient μ, the judgment can be made more accurately than in an arrangement in which the judgment is made based on only the steering velocity de. Thus, the stop/restart inhibition flag Fc can be set only when it is judged that there is a possibility that the behavior becomes unstable.

The economy-running allowing/inhibiting program represented by the flow chart of FIG. 16 is repeatedly executed at a predetermined time interval. The engine controlling program is executed in substantially the same manner as in the above embodiments.

In S71, the vehicle running velocity v, steering angle θ and road-surface friction coefficient μ are detected. In S72, it is judged whether the vehicle is running or not. When the vehicle is running, S73 is implemented to obtain the threshold values dθth, μth based on the running velocity v and in accordance with the threshold-value determining tables represented by the respective maps of FIG. 17 (a), (b). In S74 and S75 (or S77), it is judged whether the absolute value |dθ| of the steering velocity d6 is equal to or higher than the threshold value dθth and that the actual road-surface friction coefficient μ is lower than the threshold value μth.

When a positive judgment is obtained in each of S74 and S75, the stop/restart inhibition flag Fc is set in S76.

When a negative judgment is obtained in one of S74 and S75 (or S77), namely, (a) when a positive judgment and a negative judgment are obtained in S74 and S75, respectively (i.e., when the absolute value |dθ| of the steering velocity de is not lower than the threshold value dθth and the friction coefficient μ is higher than the threshold value μth) and (b) when a negative judgment and a positive judgment are obtained in S74 and S77, respectively (i.e., when the absolute value |dθ| of the steering velocity de is lower than the threshold value dθth and the friction coefficient μ is lower than the threshold value μth), the stop/restart inhibition flag Fc is kept set or reset. That is, with a negative judgment being obtained in one of S74 and S75 (or S77), the inhibition flag Fc is not set when the flag Fc is being reset, and is not reset when the flag Fc is being set.

When a negative judgment is obtained in each of S74 and S77, it is judged in S78 whether the stop/restart inhibition flag Fc is being set. When the inhibition flag Fc is not being set, the flag Fc is kept reset. When the inhibition flag Fc is not being set, S79 and S80 are implemented to reset the flag Fc when an allowance waiting time elapses. The allowance waiting time may be substantially the same length of time as that in the embodiment 1.

Thus, in the present embodiment 7, since the stop/restart inhibition flag Fc is selectively set and reset depending on the plurality of physical amounts, it is possible to accurately judge whether the behavior of the vehicle becomes unstable or not, and accordingly to set the stop/restart inhibition flag Fc only when it is really necessary to inhibit the automatic stop and restart of the engine 50.

In this arrangement, the stop/restart inhibition flag Fc is set at less opportunities than in the arrangement in which the inhibition flag Fc is selectively set and reset depending on a single physical amount, whereby it is possible to reduce opportunities at which the engine 50 is stopped, and accordingly to improve the fuel efficiency.

In the present embodiment 7, an allowing/inhibiting device is constituted principally by portions of the idle-stop control device 10 which are assigned to execute and store the economy-running allowing/inhibiting program represented by the flow chart of FIG. 16. Further, a composed allowing/inhibiting portion is constituted principally by portions of the allowing/inhibiting device which are assigned to store and execute S73 through S80.

Step S79 of the flow chart of FIG. 16 is not essential. In absence of S79, the stop/restart inhibition flag Fc can be immediately reset when a negative decision is obtained in each of S74 and S77.

Further, also when a negative decision is obtained in one of S74 and S75 (or S77), the stop/restart inhibition flag Fc may be reset, so that it is possible to further increase a period of time for which the stop/restart inhibition flag Fc is being reset, whereby the fuel efficiency can be further improved.

On the other hand, the stop/restart inhibition flag Fc may be set when the absolute value |dθ| of the steering velocity dθ is higher than the steering-velocity-based threshold value dθth and/or when the road-surface friction coefficient μ is lower than the friction-coefficient-based threshold value μth, in other words, when a negative decision is obtained in one of S74 and S75 (or S77). This arrangement makes it possible to further improve stability of the behavior of the vehicle.

Further, in the present embodiment 7, the stop/restart inhibition flag Fc is selectively set and reset depending on the absolute value |dθ| of the steering velocity de and the road-surface friction coefficient μ. However, the stop/restart inhibition flag Fc is selectively set and reset depending on two or more of a plurality of physical amounts including the absolute value |dθ| of the steering velocity dθ, the road-surface friction coefficient μ, the absolute value |θ| of the steering angle θ, the absolute value |γ| of the yaw rate γ, the absolute value of |Δγ| of a yaw rate deviation Δγ, the absolute value |β| of the slip angle β and the absolute value |αf| of the front-wheel lateral slip angle αf.

Embodiment 8

Figure 18:
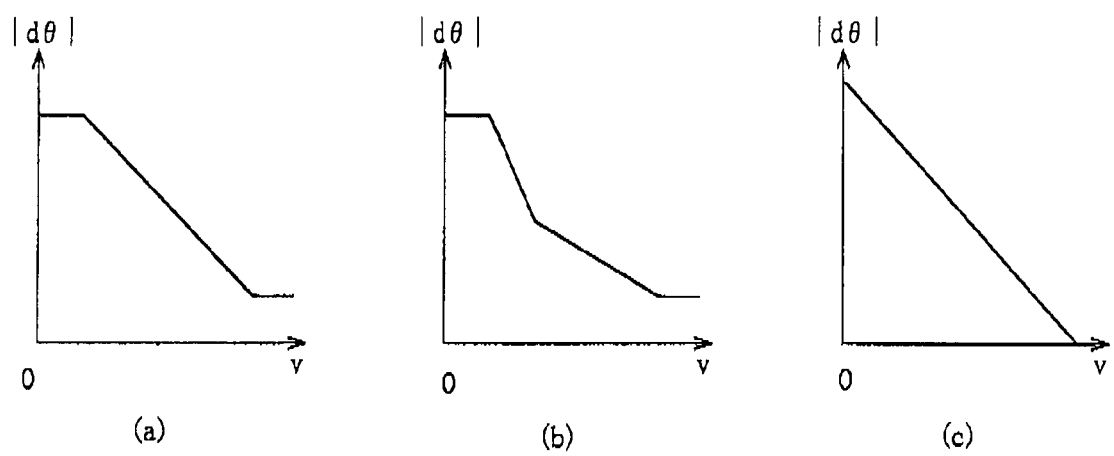
FIG. 18 is a set of maps representing threshold-value determining tables stored in a storage portion of the engine controlling apparatus according to an embodiment 8 of the invention.

The threshold-value determining table regarding the behavior-representing physical amount may be a table, as shown in FIG. 18 (a)-(c), in which the relationship between the vehicle running velocity v and the threshold value is represented by a straight line. Each of the tables shown in FIG. 18 (a)-(c) shows, by way of example, the relationship between the running velocity v and the threshold value with respect to the absolute velocity |dθ| of the steering velocity de as the behavior-representing physical amount. The threshold value with respect to the absolute velocity |dθ| of the steering velocity de may be replaced by the threshold value with respect to the absolute value |γ| of the yaw rate γ or other behavior-representing physical amount.

For example, the straight line representing the relationship may include a portion representing that the threshold value is constant irrespective of change of the running velocity v and a portion representing that the threshold value is linearly reduced with increase of the running velocity v, as in the table shown in FIG. 18 (a). Further, the straight line may include a plurality of portions representing that the threshold value is linearly reduced at respective different rates with increase of the running velocity v, as in the table shown in FIG. 18 (b). Still further, the straight line may consist of a portion representing that the threshold value is continuously reduced with increase of the running velocity v, without any portion representing that the threshold value is constant irrespective of change of the running velocity v, as in the table shown in FIG. 18 (c).

By thus simplifying the table, it is possible to reduce capacity of the storage portion 14.

While the embodiments 1-8 have been described, the features of the respective embodiments may be combined with each other so that the combined features can be carried out.

For example, the features of the embodiments 1 and 2 may be combined with each other such that there is executed an economy-running allowing/inhibiting program in which the stop/restart inhibition flag Fc is reset when the absolute value |dθ| of the steering velocity de becomes lower than an allowing threshold value, such that there is executed an economy-running allowing/inhibiting program in which the stop/restart inhibition flag Fc is reset when an allowance waiting time elapses after the absolute value |μ| of the yaw rate μ has become smaller than an inhibiting threshold value, or such that a selected one of these programs may be executed.

Further, the features of the embodiments 3 and 4 may be combined with each other, for example, such that, during running of the vehicle at a velocity v that is lower than the high-running-velocity judgment velocity vsth, the stop/restart inhibition flag Fc is reset when the deceleration G is higher than the deceleration-based threshold value Gxth, and the engine-stop inhibition flag Fc1 and the engine-restart inhibition flag Fc2 are set and reset, respectively, when the deceleration G is not higher than the deceleration-based threshold value Gxth.

Further, the feature of the embodiment 1 may be combined with the feature of the embodiment 3 or 4 such that, during running of the vehicle at a high velocity v, the stop/restart inhibition flag Fc is selectively set or reset depending on the steering velocity de.

Further, the feature of the embodiment 3 or 4 may be combined with the feature of the embodiment 7 such that, during of running of the vehicle at a high or low velocity, the stop/restart inhibition flag Fc is selectively set or reset depending on two or more physical amounts.

Further, the feature of any one of the embodiments 1-7 may be combined with the feature of the embodiment 8 such that the threshold value is changed in a stepwise manner with change of the running velocity v of the vehicle, as in the threshold-value determining tables represented by the maps of FIG. 18 (a), (b).

Further, the running judgment velocity voth may be determined depending on the road-surface friction coefficient μ. The running judgment velocity voth may be a value that is lower when the road-surface friction coefficient μ is low than when the friction coefficient μ is high. This is because, when the road-surface friction coefficient μ is low, the behavior of the vehicle could become unstable due to the automatic stop and/or restart of the engine 50, even by a low running velocity v of the vehicle. To the contrary, the running judgment velocity voth may be a value that is higher when the road-surface friction coefficient μ is low than when the friction coefficient μ is high. This is because it is desirable that the engine 50 is not automatically stopped and restarted, during running of the vehicle on a road surface having a low friction coefficient μ.

Moreover, each of the engine stop condition and the engine restart condition is not limited to the detail of the above embodiments. For example, the engine stop condition may include (d) a requirement that the running velocity v of the vehicle is not higher than a predetermined velocity and (e) a requirement that the vehicle is not running on a road surface having a low friction coefficient. Further, the engine restart condition may exclude (x) a requirement that a booster negative pressure is closer to an atmospheric pressure than a predetermined pressure. This is because, even when the booster negative pressure is closer to the atmospheric pressure than the predetermined pressure, it is possible to activate a pump device provided for serving exclusively for obtaining a sufficient booster negative pressure, or to increase a pressing force applied from a friction member to a brake rotary body, by a fluid pressure or an electromagnetic force (i.e., drive force of an electric motor).

Further, in the present description, the absolute value of the steering velocity or the like has been treated as the physical amount. However, the steering velocity or the like may be treated as the physical amount, and the absolute value of the steering velocity or the like may be treated as the absolute value of the physical amount.

Moreover, the hardware construction is not limited to details of the above embodiments. For example, the engine controlling apparatus may be constituted by cooperation of a plurality of computers such as a braking controlling device and a steering controlling device. Specifically described, the running velocity of the vehicle may be obtained by the braking controlling device constituted principally by the computer while the steering velocity of the steering operation member maybe obtained by the steering controlling device constituted principally by the computer, such that the obtained running velocity and steering velocity are supplied to the idle-stop control device via CAN (Car Area Network).

Further, it is to be understood that the present invention is not limited to the above embodiments, and may be otherwise embodied with various changes and modifications which would be based on knowledge of those skilled in the art.

DESCRIPTION OF REFERENCE SIGNS

10: idle-stop control device 20: wheel velocity sensor 22: longitudinal acceleration sensor 28: steering amount sensor 30: yaw rate sensor 32: lateral acceleration sensor 38: road-surface friction-coefficient obtaining device 40: fuel-efficiency obtaining device 50: engine 54: economy-running-mode selector switch

What is claimed is:

1. An engine controlling apparatus for executing, during running of a vehicle, at least one of (i) an engine automatic stop control for automatically stopping an engine of the vehicle and (ii) an engine automatic restart control for automatically restarting the engine, said engine controlling apparatus comprising:
    an input portion to which a yaw rate sensor is connected, said yaw rate sensor being configured to detect a yaw rate of the vehicle;
    a storage portion storing therein a threshold-value determining table representing a relationship between a running velocity of the vehicle and a threshold value that is determined for the running velocity, the threshold value being determined such that the determined threshold value is smaller when the running velocity is high than when the running velocity of the vehicle is low; and
    an inhibiting portion that is configured to inhibit the execution of said at least one of (i) the engine automatic stop control and (ii) the engine automatic restart control, when the yaw rate detected by said yaw rate sensor is not smaller than the threshold value.

2. The engine controlling apparatus according to claim 1, wherein said inhibiting portion includes a portion which is configured to inhibit the execution of said at least one of (i) the engine automatic stop control and (ii) the engine automatic restart control when the yaw rate is not smaller than an inhibiting threshold value as the threshold value, and said engine controlling apparatus comprising a hysteresis-based allowing portion which is configured to allow the execution of said at least one of (i) the engine automatic stop control and (ii) the engine automatic restart control when the yaw rate is not larger than an allowing threshold value that is smaller than the inhibiting threshold value.

3. The engine controlling apparatus according to claim 1, comprising a time-elapse-based allowing portion which is configured to allow the execution of said at least one of (i) the engine automatic stop control and (ii) the engine automatic restart control when an allowance waiting time elapses after the yaw rate has become smaller than the threshold value.

4. The engine controlling apparatus according to claim 1, comprising a portion configured to selectively allow and inhibit the execution of said at least one of (i) the engine automatic stop control and (ii) the engine automatic restart control, by comparing each of at least one braking-behavior-representing physical amount representing behavior of the vehicle upon braking of the vehicle, with a threshold value which is determined, depending on the running velocity of the vehicle, for said each of the at least one braking-behavior-representing physical amount, wherein the at least one braking-behavior-representing physical amount includes at least one of an amount representing a deceleration of the vehicle and an amount representing a state of operation of a brake operating member performed by an operator.

5. The engine controlling apparatus according to claim 1, comprising a portion that is configured to selectively allow and inhibit the execution of said at least one of (i) the engine automatic stop control and (ii) the engine automatic restart control, by comparing a friction coefficient of a road surface, with a threshold value which is determined for the friction coefficient.

6. The engine controlling apparatus according to claim 1, comprising a physical amount changer configured to change, depending on a state of running the vehicle, each of at least one of a plurality of physical amounts representing behavior of the vehicle, from a selected one of the plurality of physical amounts to another selected one of the plurality of physical amounts.

7. The engine controlling apparatus according to claim 6, wherein said physical amount changer is configured to change each of said at least one of the plurality of physical amounts, such that one of the plurality of physical amounts which is selected when the running velocity of the vehicle is higher than a first predetermined running velocity and another one of the plurality of physical amounts which is selected when the running velocity is lower than the first predetermined running velocity, are different in kind from each other.

8. The engine controlling apparatus according to claim 6, wherein the behavior-representing physical amounts include at least one turning-behavior-representing physical amount representing the behavior of the vehicle upon turning of the vehicle and at least one braking-behavior-representing physical amount representing the behavior of the vehicle upon braking of the vehicle, wherein said physical amount changer is configured to employ the at least one braking-behavior-representing physical amount as said at least one of the plurality of physical amounts, when the running velocity of the vehicle is lower than a third predetermined velocity, and wherein said physical amount changer is configured to employ the at least one turning-behavior-representing physical amount as said at least one of the plurality of physical amounts, when the running velocity of the vehicle is not lower than the third predetermined velocity.

9. The engine controlling apparatus according to claim 1, wherein behavior-representing physical amounts include at least one turning-behavior-representing physical amount representing behavior of the vehicle upon turning of the vehicle and at least one braking-behavior-representing physical amount representing the behavior of the vehicle upon braking of the vehicle, said engine controlling apparatus comprising a running-velocity-based allowing/inhibiting portion, wherein said running-velocity-based allowing/inhibiting portion is configured to inhibit the execution of the at least one of (i) the engine automatic stop control and (ii) the engine automatic restart control, when the running velocity of the vehicle is not lower than a fourth predetermined velocity with each of the at least one turning-behavior-representing physical amount being larger than a threshold value which is determined for said each of the at least one turning-behavior-representing physical amount, and when the running velocity of the vehicle is lower than the fourth predetermined velocity with a currently generated braking force indicated by each of the at least one braking-behavior-representing physical amount being smaller than a reference braking force indicated by a threshold value which is determined for said each of the at least one braking-behavior-representing physical amount.

10. The engine controlling apparatus according to claim 1, comprising a composed allowing/inhibiting portion that is configured to selectively allow and inhibit the execution of said at least one of (i) the engine automatic stop control and (ii) the engine automatic restart control, based on a result of comparison of a first physical amount that is a selected one of a plurality of physical amounts representing behavior of the vehicle, with a threshold value which is determined for the first physical amount, and based on a result of comparison of a second physical amount that is another selected one of the plurality of physical amounts, with a threshold value which is determined for the second physical amount.

11. The engine controlling apparatus according to claim 10, wherein at least one turning-behavior-representing physical amount includes an absolute value of a velocity of operation of a steering member of the vehicle performed by an operator of the vehicle, while turning-behavior-influencing physical amounts include a friction coefficient of a road surface that is obtained by a road-surface friction-coefficient obtaining device, wherein said composed allowing/inhibiting portion includes:

a control inhibiting portion that is configured to inhibit the execution of said at least one of (i) the engine automatic stop control and (ii) the engine automatic restart control, when the absolute value of the velocity of operation of the steering member is higher than a steering-velocity-based threshold value as a threshold value determined for the absolute value of the velocity of operation of the steering member, with the friction coefficient of the road surface being lower than a road-surface-friction-coefficient-based threshold value as a threshold value determined for the friction coefficient of the road surface; and a control allowing portion that is configured to allow the execution of said at least one of (i) the engine automatic stop control and (ii) the engine automatic restart control, when the friction coefficient of the road surface is higher than the road-surface-friction-coefficient-based threshold value, even when the absolute value of the velocity of operation of the steering member is higher than the steering-velocity-based threshold value.

12. The engine controlling apparatus according to claim 1, wherein said inhibiting portion includes a fuel-efficiency-basis threshold-value determiner that is configured to determine the threshold value, based on at least one of an actual fuel efficiency and a fuel efficiency that is demanded by an operator of the vehicle.

13. The engine controlling apparatus according to claim 1, comprising:
an idle-stop control device that is configured to execute the at least one of (i) the engine automatic stop control and (ii) the engine automatic restart control, when the running velocity of the vehicle is not lower than a value which induces a probability that behavior of the vehicle becomes unstable upon turning of the vehicle.

14. The engine controlling apparatus according to claim 1, comprising:
an engine automatic stop/restart device configured to execute each of the at least one of (i) the engine automatic stop control and (ii) the engine automatic restart control, when a corresponding one of an engine stop condition and an engine restart condition is satisfied, each of at least one of the engine stop condition and the engine restart condition includes at least a requirement that each of at least one turning-behavior-representing physical amount is smaller than a threshold value which is determined for said each of the at least one turning-behavior-representing physical amount.

15. The engine controlling apparatus according to claim 1, comprising a threshold-value determiner that is configured to determine the threshold value, such that the threshold value determined is smaller when the running velocity of the vehicle is higher than a stopped-state judgment velocity which makes it possible to judge that the vehicle is in a stopped state thereof, than when the running velocity is not higher than the stopped-state judgment velocity.

16. The engine controlling apparatus according to claim 1, wherein said inhibiting portion includes a running-velocity-basis threshold-value determiner that is configured to determine the threshold value, based on said threshold-value determining table and the running velocity.

17. The engine controlling apparatus according to claim 1, wherein said inhibiting portion includes a portion configured to inhibit the execution of the engine automatic restart control, when the yaw rate detected by said yaw rate sensor is not smaller than the threshold value.

\* \* \* \* \*